United States Patent [19]

Umetsu et al.

[11] Patent Number: 5,182,843

[45] Date of Patent: Feb. 2, 1993

[54] METHOD FOR ASSEMBLING OBJECTS BY REVERSING UP AND DOWN AN ATTITUDE OF THE ASSEMBLY

[75] Inventors: Sachio Umetsu; Toshihiko Miura, both of Kawasaki, Japan

[73] Assignee: Canon Kabushiki Kaisha, Tokyo, Japan

[21] Appl. No.: 841,202

[22] Filed: Feb. 27, 1992

Related U.S. Application Data

[63] Continuation of Ser. No. 524,083, May 16, 1990, abandoned.

[30] Foreign Application Priority Data

| May 16, 1989 | [JP] | Japan | 1-120422 |
| Mar. 26, 1990 | [JP] | Japan | 2-073506 |
| Apr. 13, 1990 | [JP] | Japan | 2-098916 |

[51] Int. Cl.$^5$ ............................................. B23P 19/04
[52] U.S. Cl. ................................... 29/445; 29/33 K; 29/33 P; 29/429
[58] Field of Search ............... 29/33 K, 33 P, 429, 29/430, 445, 463, 711; 414/96, 735, 738; 901/29, 41

[56] References Cited

U.S. PATENT DOCUMENTS

| 3,641,959 | 2/1972 | Hurst | 29/430 X |
| 4,127,925 | 12/1978 | Gaiser et al. | 29/430 |
| 4,306,663 | 12/1981 | Gelardi et al. | 29/463 X |

Primary Examiner—Joseph M. Gorski
Assistant Examiner—Peter Dungba Vo
Attorney, Agent, or Firm—Fitzpatrick, Cella, Harper & Scinto

[57] ABSTRACT

An attitude reversing method for reversing up and down an attitude of an assembly consisting of a plurality of objects in the course of an assembling operation includes a setting step for setting first and second mounting surfaces of a jig for reversing operation, having at least the first and second mounting surfaces to a mounting position and a reversed position, respectively, a mounting step for mounting the assembly on the first mounting surface set at the mounting position, a superposing step for superposing the second mounting surface on the first mounting surface, and a reversing step for reversing the jig for reversing operation while maintaining the state in which the assembly is mounted on the first mounting surface and for setting the second mounting surface at the reversed position in a state in which the assembly is placed on the second mounting surface.

2 Claims, 21 Drawing Sheets

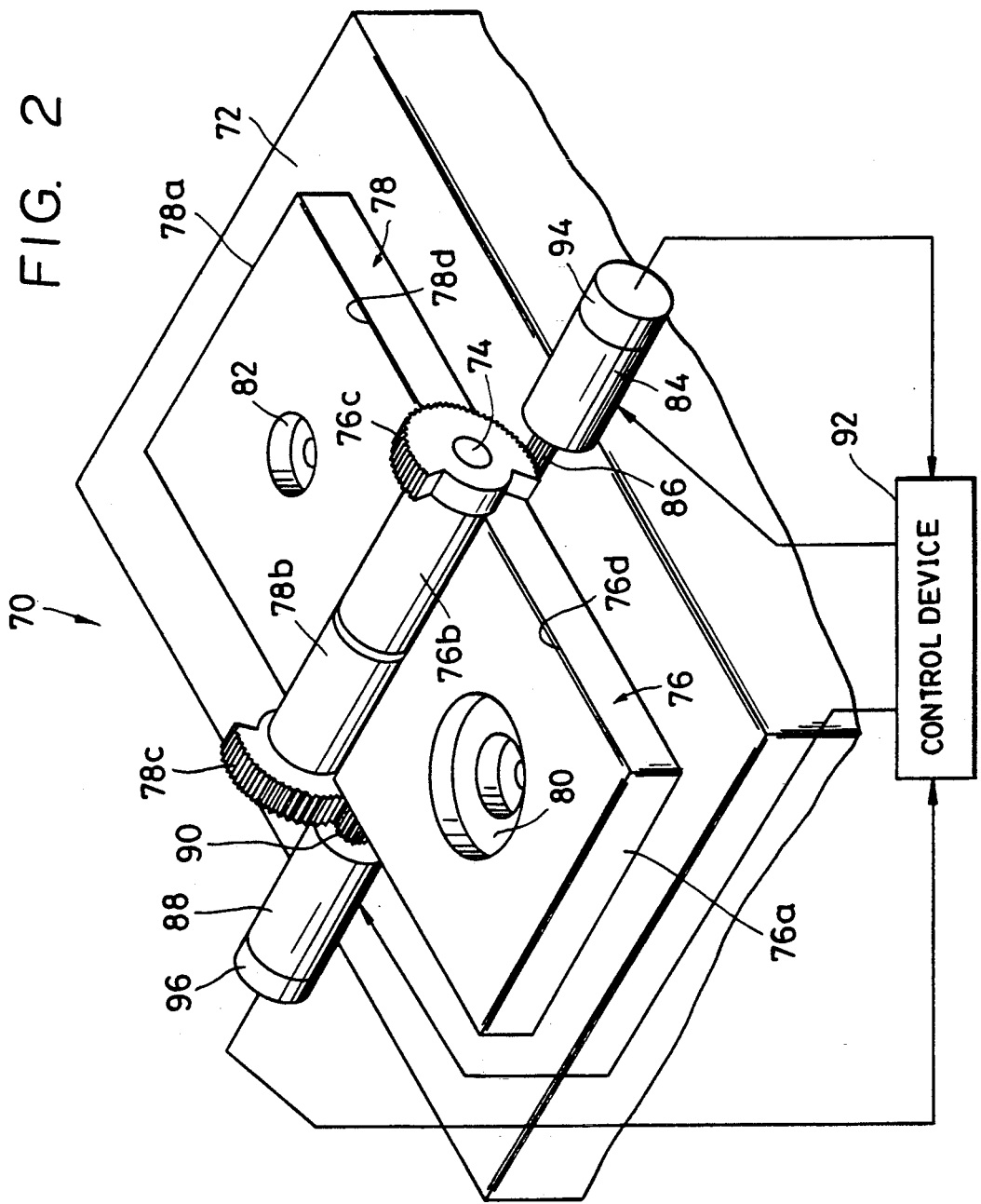

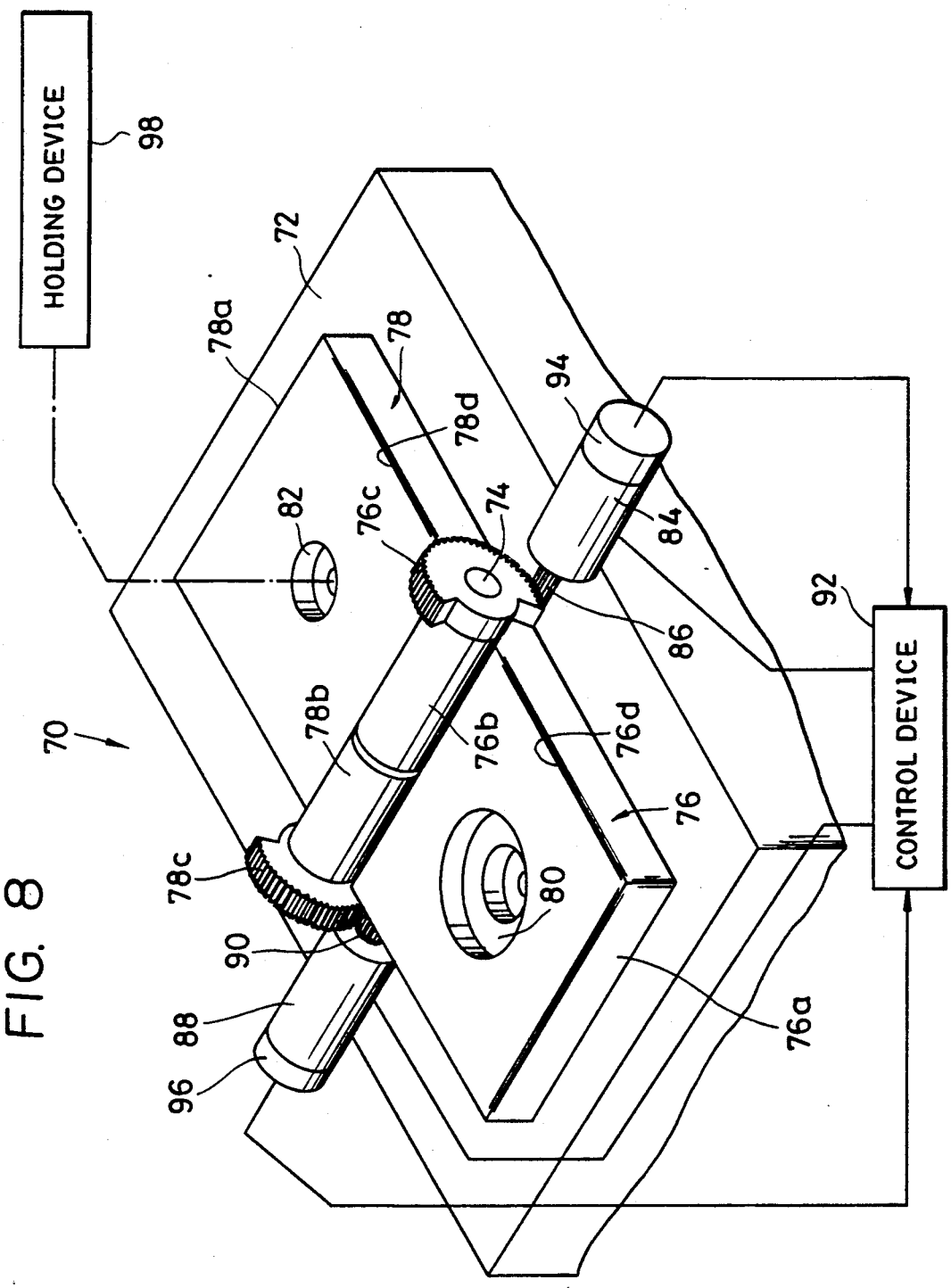

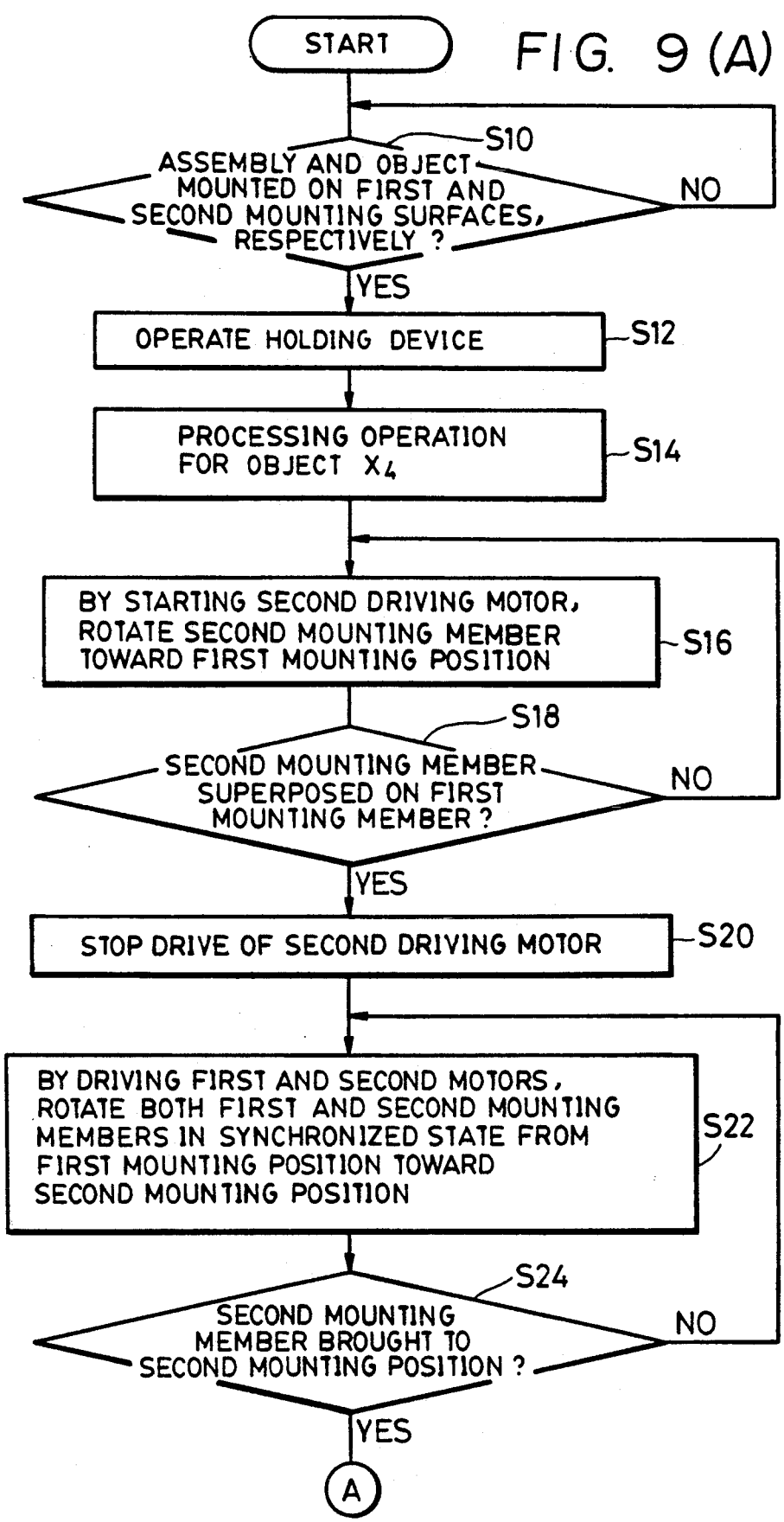

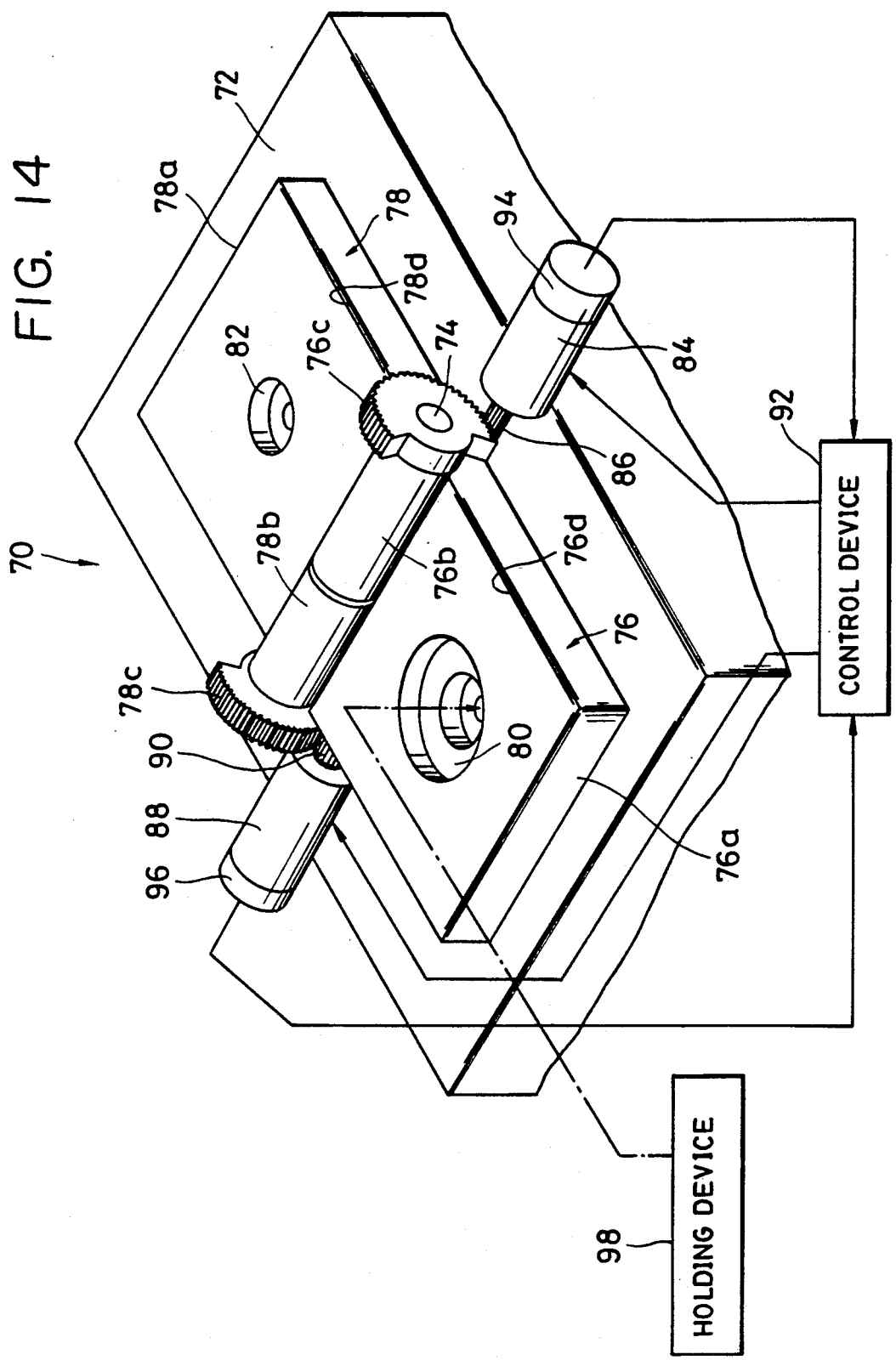

FIG. 16 (A)
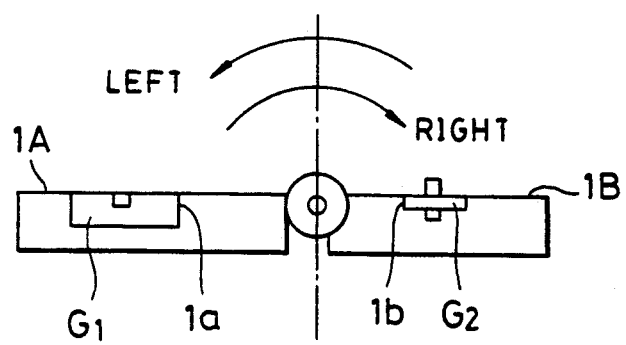
FIG. 16(B)    FIG. 16(C)
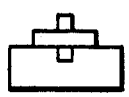    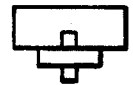

METHOD FOR ASSEMBLING OBJECTS BY REVERSING UP AND DOWN AN ATTITUDE OF THE ASSEMBLY

This application is a continuation of application Ser. No. 07/524,083 filed May 16, 1990, now abandoned.

BACKGROUND OF THE INVENTION

1. Field of the Invention

This invention relates to an attitude reversing method and an attitude reversing device for reversing up and down the attitude of an assembly consisting of a plurality of objects in the course of an assembling operation.

2. Description of the Prior Art

Heretofore, in order to reverse the attitude of an assembly consisting of a plurality of objects in the course of an assembling operation, the assembly is first grasped by a first robot and is raised from a jig for assembling operation. Fingers of the first robot are then rotated by 90 degrees in a vertical plane to first set the attitude of the assembly in a sideways state. Subsequently, the assembly is grasped by a second robot, and the grasped state by the first robot is released. Fingers of the second robot are then rotated further by 90 degrees in a vertical plane. The assembly is thus transferred from the first robot to the second robot in a state in which the attitude of the assembly is reversed up and down, and is mounted onto the jig for the assembling operation by the second robot.

In the above-described attitude reversing procedure of the assembly, however, two robots are needed. In addition, the assembly must be transferred from the first robot to the second robot after the two robots have been brought close to each other. Hence, in addition to the need for two robots, the control of the two robots becomes complicated, and it takes time for an attitude reversing operation, causing increase in production cost.

When two objects are assembled by reversing a plurality of objects in one direction using a jig for reversing operation, the reversing direction of the jig becomes an issue. That is, as shown in FIG. 16, if a spur gear $G_1$ and a shafted gear $G_2$ are held in object housing units $1a$ and $1b$ formed on first and second surface $1A$ and $1B$ of a jig $1$ for reversing operation, and the gears $G_1$ and $G_2$ are assembled by reversing the surfaces $1A$ and $1B$ in the right or left direction as shown in FIG. 16, respectively, the spur gear $G_1$ becomes situated at an upper position in the case of reversing in the right direction, and the shafted gear $G_2$ becomes situated at an upper position in the case of reversing the surface $1B$ in the left direction.

In recent assembling lines, a method has been used in which a plurality of robots assemble at least two objects by sequentially conveying them among the robots. In this case, when a third object (not shown) is assembled with the gears $G_1$ and $G_2$ assembled as shown in FIG. 16, the particular state between the state shown in FIG. 16(B) and the state shown in FIG. 16(C) is provided in the assembling process shown in FIG. 16(A) largely influences the increase or decrease of the assembling processes.

SUMMARY OF THE INVENTION

The present invention has been made in consideration of the problems as described above.

It is an object of the present invention to provide an attitude reversing method and an attitude reversing device capable of securely reversing the attitude of an assembly in the course of an assembling operation within a short time.

It is another object of the present invention to provide an assembling method for controlling the reversing direction of a jig for reversing operation in consideration of a positional relationship in the assembling operation between a third object to be assembled and already-assembled first and second objects, such as the gears $G_1$ and $G_2$ described above.

It is still another object of the present invention to provide an assembling method for efficiently assembling a plurality of objects by forming a plurality of object housing portions in one object housing surface of a jig for reversing operation, determining in which of the plurality of object housing portions an object has been housed or selecting the position of an object housing portion in which the object is to be housed when the object is housed within one of the object housing portions from object supply means by a robot, and controlling the reversing direction of the jig by this determination or selection.

BRIEF DESCRIPTION OF THE DRAWINGS

FIGS. 1 through 7 show a first embodiment of the present invention.

FIG. 1 is a perspective view showing the configuration of an automatic assembling apparatus to which the present invention is applied;

FIG. 2 is a perspective view specifically showing the configuration of an attitude reversing device shown in FIG. 1;

FIGS. 4 through 7 are front views sequentially showing a specific operation of reversing up and down the attitude of an assembly by 180 degrees in accordance with the control procedure shown in FIGS. 3(A) and 3(B).

FIGS. 8 through 15(A) and 15(B) show a second embodiment of the present invention.

FIG. 8 is a perspective view specifically showing the configuration of the attitude reversing device shown in FIG. 1;

FIGS. 9(A) and 9(B) show a flowchart showing a control procedure of a control device of the attitude reversing device in the embodiment;

FIGS. 10 through 13 are front views sequentially showing a specific operation of reversing up and down the attitude of an assembly by 180 degrees in accordance with the control procedure shown in FIGS. 9(A) and 9(B);

FIG. 14 is a perspective view specifically showing the configuration of another embodiment of the attitude reversing device according to the present invention;

FIGS. 15(A) and 15(B) show a flowchart showing a control procedure of a control device of the attitude reversing device in the other embodiment shown in FIG. 14;

FIG. 16, composed of FIGS. 16(A), 16(B) and 16(C), shows diagrams for explaining an assembling method of objects according to the present invention.

FIG. 17 is a diagram of the configuration of an assembling apparatus to which an assembling method of the present invention is applied;

FIG. 18 is a diagram of the configuration of an attitude reversing device;

FIG. 19 is a flowchart; and

FIG. 20 is a block diagram of the control of the attitude reversing device.

FIG. 21 is a diagram of the configuration of an attitude reversing device; and

FIG. 22 is a flowchart.

DETAILED DESCRIPTION OF THE PREFERRED EMBODIMENTS

The configuration of an embodiment of the automatic assembling apparatus in which an attitude reversing device according to the present invention is incorporated will now be explained in detail with reference to the attached drawings.

Figure 1:
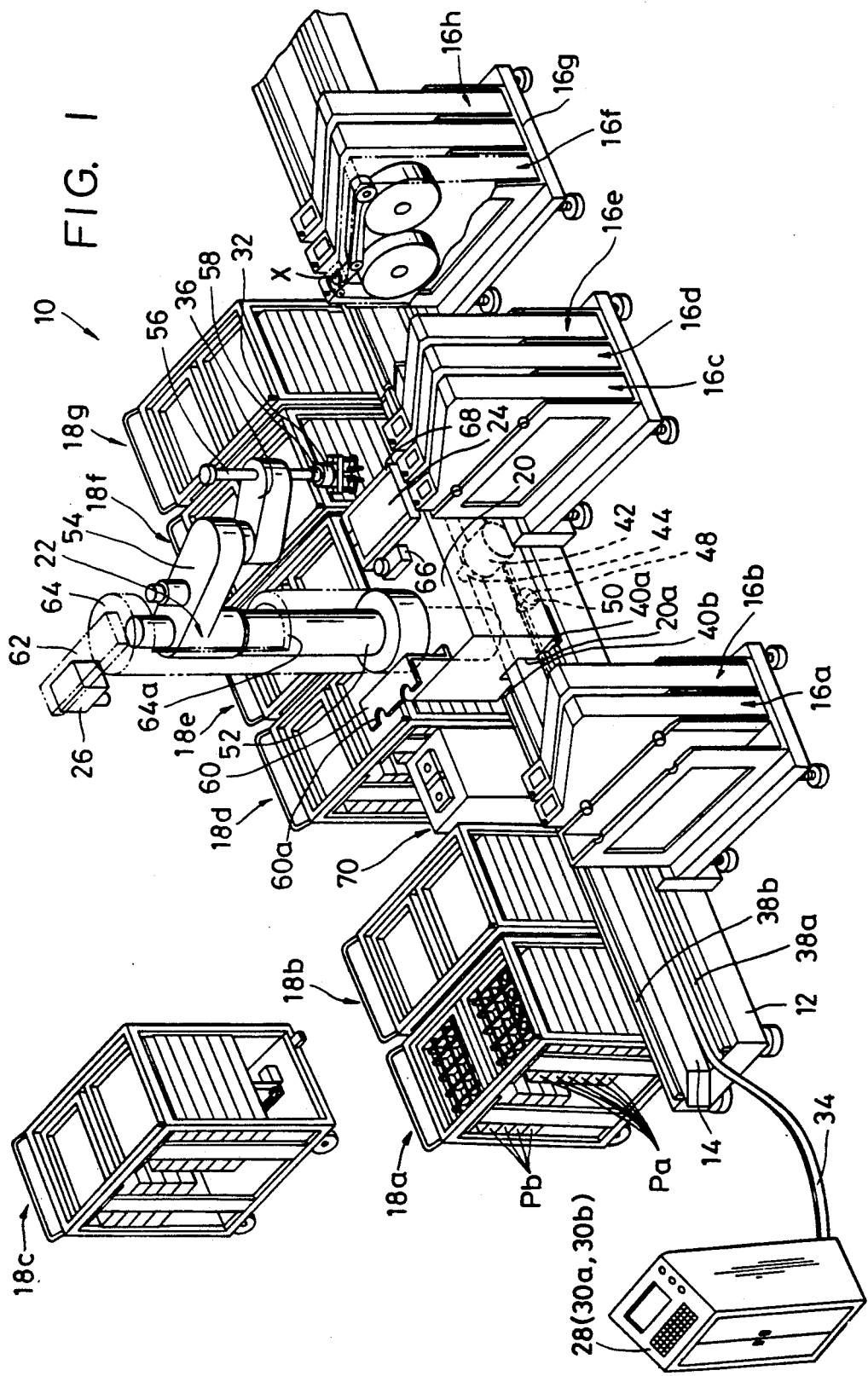

First, the entire configuration of an automatic assembling apparatus 10 according to the embodiment will be explained with reference to FIG. 1.

The automatic assembling apparatus 10 includes a shuttle base 12 extending by a predetermined length on a straight line along one direction. A main rail 14 for defining a track extending along the above-described direction is mounted on the shuttle base 12. A plurality of first assembly supply mechanisms 16 (in detail, twelve first assembly supply mechanisms 16a-16l) are disposed along the above-described direction at one side (the front side in FIG. 1) of the shuttle base 12. Similarly, a plurality of second assembly supply mechanisms 18 (in detail, ten second assembly supply mechanisms 18a-18j) are disposed at another side (the rear side in FIG. 1). In other words, the shuttle base 12 is disposed so as to extend through the space provided between the first and second assembly supply mechanisms 16 and 18.

At one side of the shuttle base 12, there is disposed an attitude reversing device 70, which is a feature of the present invention, for reversing up and down the attitude of an assembly (defined as a semi-assembly before a final assembly is completed at a final stage) consisting of a plurality of objects in the course of an assembling operation. The attitude reversing device 70 will be explained in detail later.

A shuttle 20 is mounted so as to be able to run (by itself) along the main rail 14 on the shuttle base 12. A robot 22, a jig 24 for assembling operation, and a first camera 26, serving as an imaging device, are mounted on the shuttle 20. On a base (not shown) separated from the shuttle base 12, there is provided a control device 28 for running the shuttle 20 on the main rail 14, and for controlling the robot 22 to sequentially access the plurality of first assembly supply mechanisms 16 and second assembly supply mechanisms 18 to assemble a predetermined assembly which is then transferred to the jig 24 for further assembling operations. In the course of the assembling operations, an attitude reversal may be needed. Such attitude reversal is performed using the reversal device 70.

The first camera 26, which is fixed on the shuttle 20 and moves together with the shuttle 20 as one body, is provided in order to image the arrangement (more specifically, the state of position deviation within a plane and the rotation state around a vertical axis) of a sub-assembly X within an assembly supply box (hereinafter briefly termed a pallet) in the first assembly supply mechanism 16 or in the second assembly supply mechanism 18. The imaged information (image information) is transmitted to a first recognition unit 30a in the control device 28. The arrangement of the assembly is recognized in the first recognition unit 30a.

The control device 28 is also configured so as to control the grasped position and the attitude of the assembly by fingers 32 of the robot 22 at proper position and attitude according to the arrangement information of the assembly recognized by the first recognition unit 30a. For such control of the drive of the robot 22 and control of the run of the shuttle 20 by the control device 28, the control device 28 is connected to the shuttle 20 and the robot 22 via a flexible connection cable 34.

The control device 28 is further configured so as to recognize the arrangement state of the sub-assembly X within the pallet P in the second assembly supply mechanism 18 via the first recognition unit 30a when the picking-up operation of the sub-assembly X by the robot 22 has been completed in the second assembly supply mechanism 18 and an arm 36 of the robot 22 has retreated from above the second assembly supply mechanism 18, to detect and store the position of the sub-assembly X to be picked up at the subsequent picking-up operation of the assembly by the robot 22, and to control the drive of the fingers 32 of the robot 22 in order to pick up the sub-assembly X the position of which has been detected.

Next, the shuttle 20 and a composing assembly mounted on the shuttle 20 will be explained in detail.

A pair of guide rails 38a and 38b are fixed at both sides of the main rail 14 in a state parallel to it on the shuttle base 12. The shuttle 20 has a recess 20a, in which the main rail 14 is inserted, at its lower surface in a state extending along the direction described before. At both sides of the recess 20a are fixed guide bearings 40a and 40b fitted to the guide rails 38a and 38b from above, respectively, and for defining the direction of the run of the shuttle 20 to the above-described direction.

A reversibly rotatable driving motor 42 for running the shuttle is housed within the shuttle 20, and a driving wheel 44 is coaxially fixed on the distal end of the driving motor 42. The driving wheel 44 is set so as to rotatably contact the main rail 14 while being pressed by a pressing mechanism (not shown). According to this configuration, by starting the driving motor 42, the driving wheel 44 is rotatably driven to rotatably move on the friction-engaged main rail 14. The shuttle 20 is thus subjected to running drive (reciprocating drive) on the main rail 14 along the above-described direction.

A rack 46 extending along the above-described direction is disposed on the shuttle base 12 in a state provided between the main rail 14 and the guide rail 38a. On the other hand, a pinion gear 48 is rotatably pivoted within the shuttle 20 in a state meshing with the rack 46. A rotary encoder 50 is provided on the rotation shaft of the pinion gear 48 in order to detect the amount of its rotation. Since the pinion gear 48 thus rotates in accordance with the run of the shuttle 20, the amount of run (running distance) of the shuttle 20 can be detected by detecting the amount of rotation of the pinion gear 48 by the rotary encoder 50.

The robot 22 includes a robot main body 52 fixed on the shuttle 20 in a stand-up state, a first pivoting arm 54 rotatably mounted around a vertical axis at an upper portion of the robot main body 52, a second pivoting arm 36 mounted around a vertical axis at a distal end of the first pivoting arm 54, and a z-axis arm 56 mounted so as to be movable up and down at the distal end of the second pivoting arm 36. The fingers 32 are mounted at a lower end of the z-axis arm 56 via a finger manipulating mechanism 58. The fingers 32 are configured as three-fingered general-purpose fingers.

Although the details are not illustrated, the robot 22 also includes a first driving motor for rotatably driving the first pivoting arm 54, a second driving motor for rotatably driving the second pivoting arm 36, a third driving motor for moving up and down the z-axis arm 56, and a fourth driving motor for rotably driving the z-axis arm 56. By properly controlling the drive of these first through fourth driving motors, it becomes possible to move the fingers 32 to an arbitrary position within the range of a circle having a radius of distance 1 from the center of the robot main body 52 to the center of the z-axis arm 56 when the first pivoting arm 54 and the second pivoting arm 36 are set in a straight line.

In other words, since the robot 22 is moved in accordance with the run of the shuttle 20, it becomes possible to move the fingers 32 to an arbitrary position within the range covering the width of the distance 1 at both sides from the center of the robot main body 52, that is, to freely access an assembly situated within this range.

A finger stocker 60 is disposed on the shuttle 20 at a position independent of the robot main body 52. A plurality of different kinds of sets of fingers are detachably mounted on the finger stocker 60, and it is set so as to be able to mount an arbitrary set of fingers 32 at a lower end of the z-axis arm 56. The finger stocker 60 has notches 60a having a nearly U-like shape and lock pins (not shown). On the other hand, each set of fingers 32 has a stepped shaft portion (not shown) to be fitted with the notch 60a, and a set of fingers for exchange (not shown) can be stocked at the notch 60a by engaging the stepped shaft portion with the notch 60a.

The first camera 26, which is provided in order to image the arrangement state of the sub-assembly X housed within the pallet P in the second assembly supply mechanism 18, is fixed to a first camera mounting pole 64 via a bracket 62 so as to recognize the entire inside of the pallet P from above each second assembly supply mechanism 18. The pole 64 is fixed on the shuttle 20 so as to surround the robot main body 52. An opening 64a is formed over the pivoting range of the first pivoting arm 54 so as not to hinder the pivoting operation of the pivoting arm 54.

On the other hand, a second camera 66 is mounted on the shuttle 20 so as to be able to image the fingers 32 from below. It is set so that an image of the fingers 32 imaged by the second camera 66 is stored in a second recognition unit 30b of the control mechanism 28. The second recognition unit 30b is configured so as to be able to recognize the grasped state of the sub-assembly X grasped by the fingers 32 according to the image information transmitted thereto from the second camera 66.

Although the details are not illustrated, the jig 24 for assembling operation comprises a jig mounting guide 68 and a tray (not shown) positioned and fixed on the shuttle 20 by jig-positioning lock pins (not shown). The jig 24 for assembling operation is configured so as to be suitable for assembling a predetermined assembly from twelve kinds of assemblies supplied from the first assembly supply mechanisms 16a–16l and ten kinds of assemblies supplied from the second assembly supply mechanisms 18a–18j. It is also set so that, by demounting the tray from the jig mounting guide 68, an assembly in course of assembling operation is transferred to the next robot in a state in which the assembly is mounted on the tray.

Until a final assembly is completed from a plurality of objects, a partial assembly of objects in the course of the assembling operation is mounted on the jig 24.

Next, an attitude reversing device 70, which is a feature of the present invention, will be explained in detail with reference to FIGS. 2 through 7.

That is, while a predetermined assembly is being assembled from a plurality of objects in the above-described robot 22, there often arises a case in which it is necessary to reverse the attitude of a partial assembly so far assembled and to assemble a new object at a place which has previously been a base. In this case, the robot 22 operates so as to grasp the assembly mounted on the jig 24, convey it to the attitude reversing device 70, reverse up and down the attitude of the assembly in the attitude reversing device 70, grasp again the assembly the attitude of which has been reversed up and down, and mount it on the jig 24. Thus, on the jig 24, a place which has previously been a base of the assembly becomes an upper surface, on which an object can easily be mounted.

In the present embodiment, for the purpose of simplifying the explanation, it is assumed that an assembly A is assembled from gears $x_1$ and $x_2$ having large and small diameters, respectively, and coaxially provided in parallel to each other, and a rotation shaft $x_3$ coaxially passing through them.

As shown in FIG. 2, the attitude reversing device 70 includes a support 72 mounted on a base (not shown), and one rotation support shaft 74 horizontally extending on the support 72. A pair of mounting members 76 and 78 are rotatably supported on the support 72 making the rotation support shaft 74 a common center of rotation. That is, the first mounting member 76 is formed, in one body, by a first main body portion 76a formed in the shape of a nearly flat plate, a first pivoting portion 76b provided only at a portion corresponding to the front-side half in FIG. 2 of the rotation support shaft 74 and pivoted by the rotation support shaft 74, and a first gear portion 76c coaxially mounted at the front side in FIG. 2 of the first pivoting portion 76b.

On the other hand, the second mounting member 78 is formed, in one body, by a second main body portion 78a formed in the shape of a nearly flat plate, a second pivoting portion 78b provided only at a portion corresponding to the rear-side half in FIG. 2 of the rotation support shaft 74 and pivoted by the rotation support shaft 74, and a second gear portion 78c coaxially mounted at the rear side in FIG. 2 of the second pivoting portion 78b.

As shown in FIG. 2, the first and second mounting members 76 and 78 are positioned at a mounting position and a reversed position, respectively, in a state opened with each other by 180 degrees on the support 72. In the state in which the first and second mounting members 76 and 78 are positioned on the mounting position and reversed position, respectively, first and second mounting surfaces 76d and 78d are defined by the upper surfaces of the respective members.

On the first mounting surface 76d, a first recess 80 is formed in which the lower portion of the above-described assembly A, that is, the lower portion of the rotation shaft $x_3$, the gear $x_2$ having a small diameter and the gear $x_1$ having a large diameter are to be fitted. On the other hand, on the second mounting surface 78d, a second recess 82 is formed in which the upper portion of the assembly A, that is, the upper portion of the rotation shaft $x_3$ is to be fitted. In a state in which the first and second mounting members 76 and 78 are superposed one above another, the entire assembly A is nondemountably held in a state fitted within the two recesses 80 and 82, that is, in a state sandwiched between the two mounting members 76 and 78.

A first reversibly rotatable driving motor 84 is disposed in order to rotatably drive the first mounting member 76. A first driving gear 86 meshing with the above-described first gear 76c is mounted on the driving shaft of the first driving motor 84 in a manner forming one body. Furthermore, a second reversibly rotatable driving motor 88 is disposed in order to rotatably drive the second mounting member 78. A second driving gear 90 meshing with the above-described second gear portion 78c is mounted on the driving shaft of the second driving motor 88 in a manner forming one body.

The first and second driving motors 84 and 88 are connected to a control device 92 for controlling their driving state. The control device 92 is configured so as to output control signals to the first and second driving motors 84 and 88 in order to perform a reversing operation to reverse up and down the attitude of the assembly A according to a control procedure previously set in the control device 92. The first and second driving motors 84 and 88 mount rotary encoders 94 and 96 for detecting the amounts of rotation drive by the respective motors. The control device 92 can detect current positions of the first and second mounting members 76 and 78 according to detection results by the rotary encoders 94 and 96.

An attitude reversing control procedure of the assembly A in the control device 92 will now be explained in detail with reference to the flowchart shown in FIG. 3 and the diagrams of the operation shown in FIGS. 4 through 7.

Figure 4:
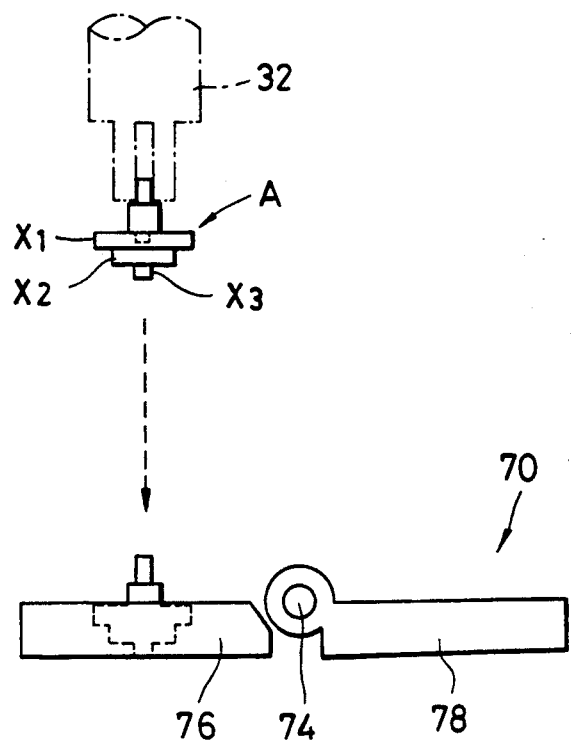

First, as shown in FIG. 4, in a reversing operation waiting state, the first mounting member 76 and the second mounting member 78 are positioned at the mounting position and the reversed position, respectively. In other words, in the reversing operation waiting state, the first and second mounting members 76 and 78 are set in a state opened by 180 degrees making the rotation support shaft 74 a center of rotation on the support 72. Accordingly, in this reversing operation waiting state, the first mounting surface 76d of the first mounting member 76 is upwardly opened.

Figure 3A:
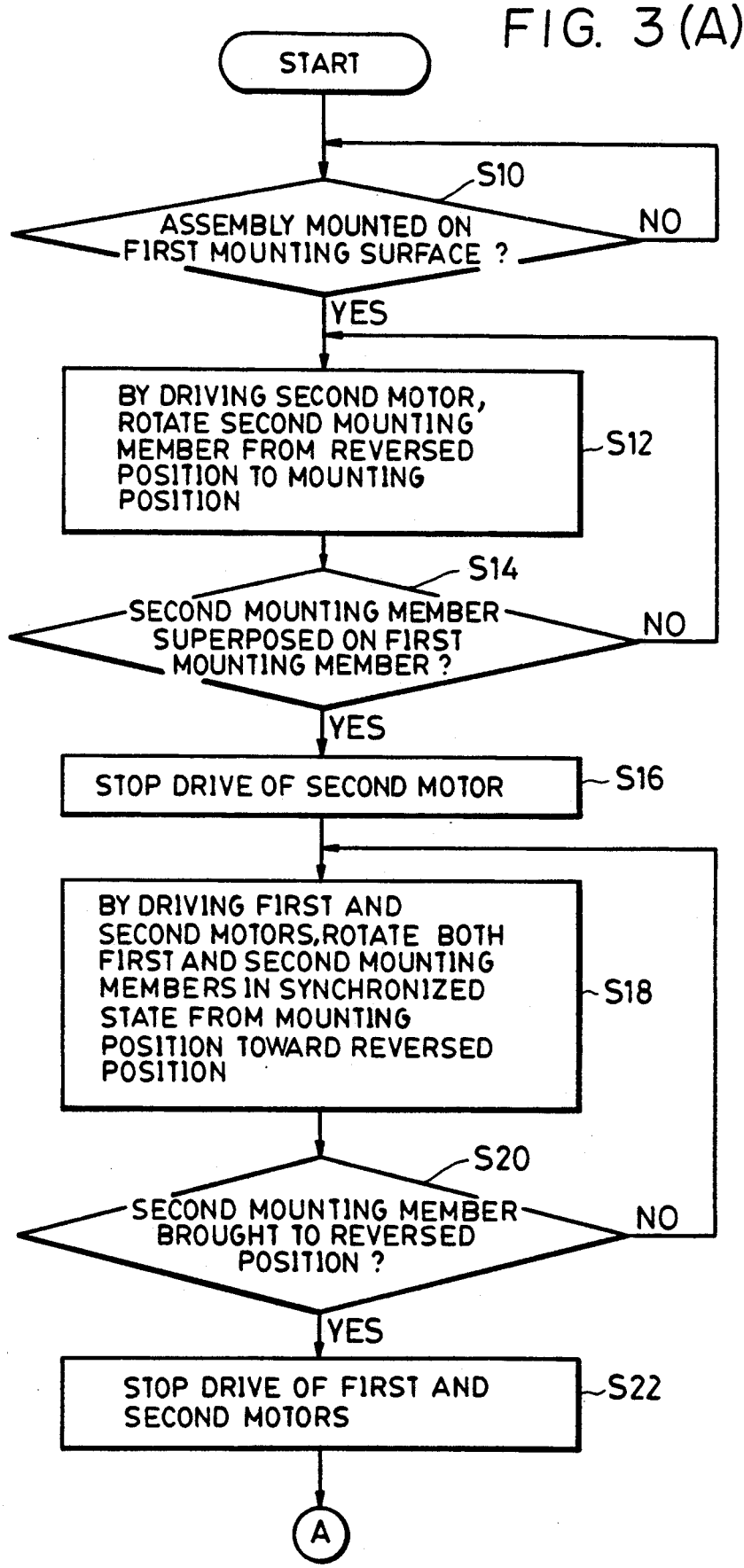
FIGS. 3(A) and 3(B) show a flowchart showing a control procedure of a control device of the attitude reversing device.
Figure 3B:
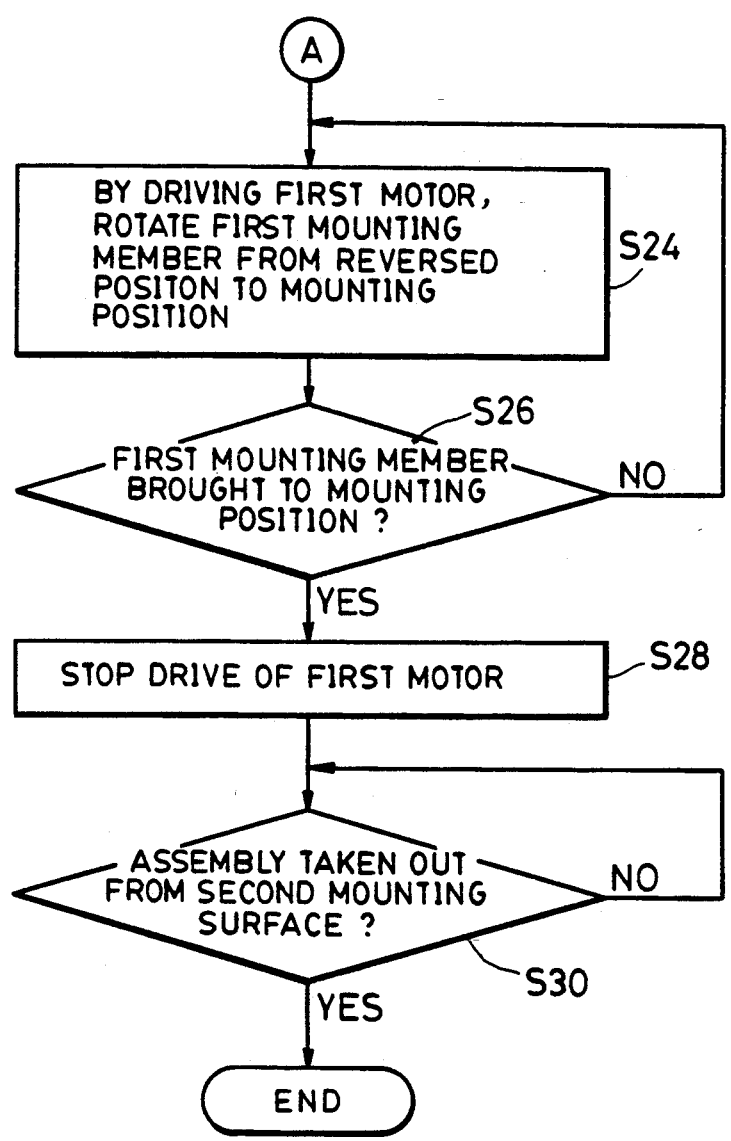

As shown in step S10 in FIG. 3(A), the reversing operation waiting state is continued until it is detected that the assembly A has been mounted on the first mounting surface 76d. It is set so that the control device 92 detects the mounted state of the assembly A on the first mounting surface 76d by the fact that the robot 22 receives via its fingers 32 a signal notifying that the assembly A has been fitted within the first recess 80 formed on the first mounting surface 76d, the fingers 32 release the operation of grasping the assembly A, and the pivoting arm 36 of the robot 22 is raised in order to wait above the attitude reversing device 70.

When the determination at step S10 is "yes", that is, it is detected that the assembly A has been mounted on the first mounting surface 76d, by starting the second driving motor 88 so as to rotate in the counterclockwise direction in FIG. 4, the second mounting member 78 situated at the reversed position is rotated toward the mounting position around the rotation support shaft 74, at step S12. Then, at step S14, if it is detected that the second mounting member 78 has been brought to a position superposed on the first mounting member 76 situated at the mounting position according to a detection signal from the second rotary encoder 96, the drive of the second driving motor 88 is stopped at step S16.

Figure 5:
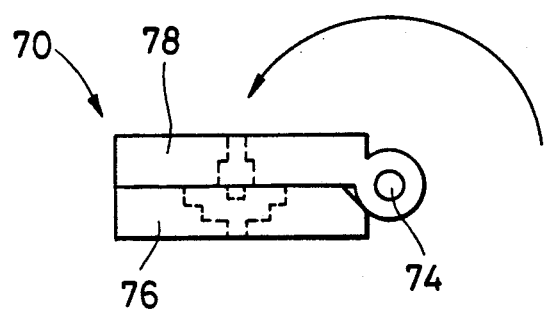

As a result, as shown in FIG. 5, the assembly A mounted on the first mounting surface 76d is covered with the second mounting member 78. In other words, the assembly A is non-demountably held in a state sandwiched between the first and second mounting members 76 and 78.

Subsequently, step S18 is executed. At step S18, by starting both the first and second driving motors 84 and 88 so as to be driven in the clockwise direction in FIG. 5, both the first and second mounting members 76 and 78 are rotated from the mounting position toward the reversed position in a mutually synchronized state, that is, with an identical rotation speed. By this synchronized rotation of the first and second mounting members 76 and 78, the assembly A is rotated from the mounting position to the reversed position while maintaining the state sandwiched between the mounting members 76 and 78.

Subsequently, at step S20, when it is detected via the second rotary encoder 96 that the second mounting member 78 has been brought to the reversed position, the drive of the first and second driving motors 84 and 88 is stopped.

Figure 6:
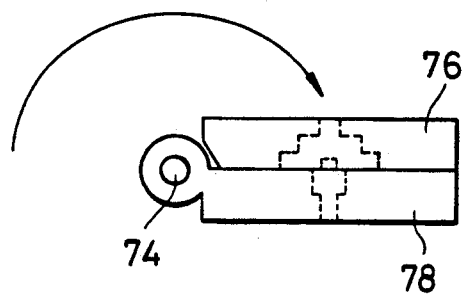

As a result, as shown in FIG. 6, the second mounting member 78 is brought to the reversed position, and the first mounting member 76 is brought in a state superposed on the second mounting member 78. The assembly A mounted on the first mounting surface 76d is thus mounted on the second mounting member 78d at the reversed position. In the state rotated to the reversed position shown in FIG. 6, the attitude of the assembly A sandwiched between the mounting members 76 and 78 is shifted from the state situated at the mounting position to the state reversed up and down by 180 degrees.

While processes from step S18 to S22 are executed, the robot 22 moves the second pivoting arm 36 so that the fingers 32 are positioned immediately above the assembly A brought to the reversed position.

Subsequently, as shown in step S24, by driving the first driving motor 84 in the counterclockwise direction in FIG. 6, the first mounting member 76 is rotated toward the mounting position. At step S26, if it is detected via the first rotary encoder 94 that the first mounting member 76 has been brought to the mounting position, the drive of the first driving motor 84 is stopped at step S28.

Figure 7:
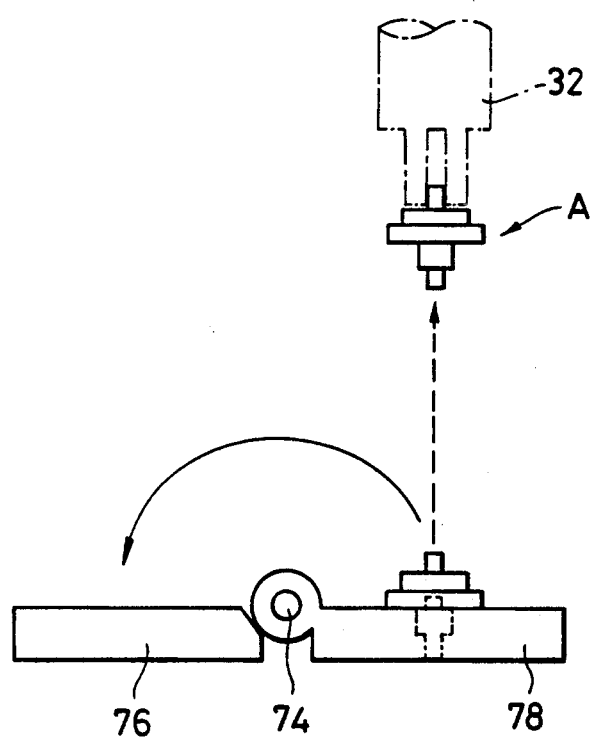

As a result, as shown in FIG. 7, the second mounting surface 78d of the second mounting member 78 situated at the reversed position is opened, and the assembly A, the attitude of which has been reversed up and down, becomes in a state capable of being grasped by the fingers 32 of the robot 22 from above.

At step S30, by confirming by a signal from the robot 22 that the assembly A fitted within the second recess 82 formed on the second mounting surface 78d has been taken out by the fingers 32 of the robot 22, a series of attitude reversing operation control processes are terminated, and the above-described reversing operation waiting state is set again.

That is, in the attitude reversing device 70 of the present embodiment, the attitude of the assembly A grasped from the second mounting surface 78d by the fingers 32 of the robot 22 is set in a state in which the attitude of the assembly A when mounted on the first mounting surface 76a by the fingers 32 is reversed up and down by 180 degrees. Thus, in the present embodiment, it becomes possible to reverse the attitude of the assembly A in a state reversed up and down by 180 degrees within a short time by using the attitude reversing device 70, without using two robots.

Furthermore, in the attitude reversing device 70 of the present embodiment, while the assembly A is rotated around the rotation support shaft 74 in order to change its attitude up and down by 180 degrees, the assembly A is maintained in the state sandwiched between the first and second mounting members 76 and 78. Hence, during this reversing operation, the attitude reversing operation can be securely executed without disassembling the assembly A in course of assembling operation.

The present invention is not limited to the configuration of the above-described embodiment, but various changes and modifications may, of course, be made without departing from the spirit and scope of the invention.

For example, although, in the above-described embodiment, an explanation has been provided of a case in which the assembly A is assembled from the gears $x_1$ and $x_2$ having large and small diameters, respectively, and coaxially provided in parallel to each other, and the rotation shaft $x_3$ coaxially passing through them, the present invention is not limited to the reversing operation of such an assembly A, but can reverse the attitude of an assembly having any configuration up and down by 180 degrees.

Furthermore, although, in the above-described embodiment, an explanation has been provided of a case in which driving motors are adopted as driving means for rotating the first and second mounting members 76 and 78, the present invention is not limited to such a configuration, but, for example, hydraulic cylinders, electromagnetic solenoids or the like may, of course, be used.

As described above in detail, an attitude reversing method for reversing up and down an attitude of an assembly consisting of a plurality of objects in course of assembling operation according to the present invention is characterized in that it comprises a setting step for setting a first mounting surface of a jig for reversing operation at least having first and second mounting surfaces to a first mounting position, a mounting step for mounting a predetermined assembly on the first mounting surface set at the mounting position, a superposing step for superposing the second mounting surface on the first mounting surface, and a reversing step for reversing the jig for reversing operation while maintaining a state in which the assembly is mounted on the first mounting surface, and for setting the second mounting surface at a reversed position in a state in which the assembly is placed on the second mounting surface.

The attitude reversing method is also characterized in that the first and second mounting surfaces are provided on an identical horizontal surface in a state separated from each other by 180 degrees around an identical rotation shaft.

The attitude reversing method is also characterized in that the reversing step includes a first substep for rotating the first and second mounting surfaces from the mounting position to the reversed position in a manner forming one body in a state in which the second mounting surface is covered on the first mounting surface mounting the assembly, and a second substep for rotating the first mounting surface to the mounting position after the second mounting surface has been set at the reversed position to open the second mounting surface.

Furthermore, in order to solve the problems described above and to achieve the objects, an attitude reversing device for reversing up and down an attitude of an assembly consisting of a plurality of objects in course of assembling operation according to the present invention is characterized in that it comprises a jig for reversing operation rotatably having at least first and second mounting surfaces and capable of mounting the assembly on either one of the mounting surfaces, first driving means for reciprocating the first mounting surface between a mounting position and a reversed position, and second driving means for reciprocating the second mounting surface between between the reversed position and the mounting position.

The attitude reversing device is also characterized in that the first and second mounting surfaces are provided on an identical horizontal surface in a state separated from each other by 180 degrees around an identical rotation shaft.

The attitude reversing device is also characterized in that, when the first driving means rotates the first mounting surface from the mounting position toward the reversed position, the second driving means drives the second mounting surface covered on the first mounting surface in a synchronized state so as to bring the second mounting surface to the reversed position.

Hence, according to the present invention, an attitude reversing method and attitude reversing device are provided which can securely reverse the attitude of an assembly in the course of an assembling operation within a short time.

Next, an explanation will be provided of a second embodiment of the present invention with reference to FIGS. 8 through 15(A) and 15(B).

In the second embodiment, a means 98 for holding an object $x_4$ mounted on the second mounting member is added.

The above-described control device 92 is electrically connected to the holding device 98, which is controlled so as to execute a holding operation according to a control procedure of the control device 92.

Figure 9B:
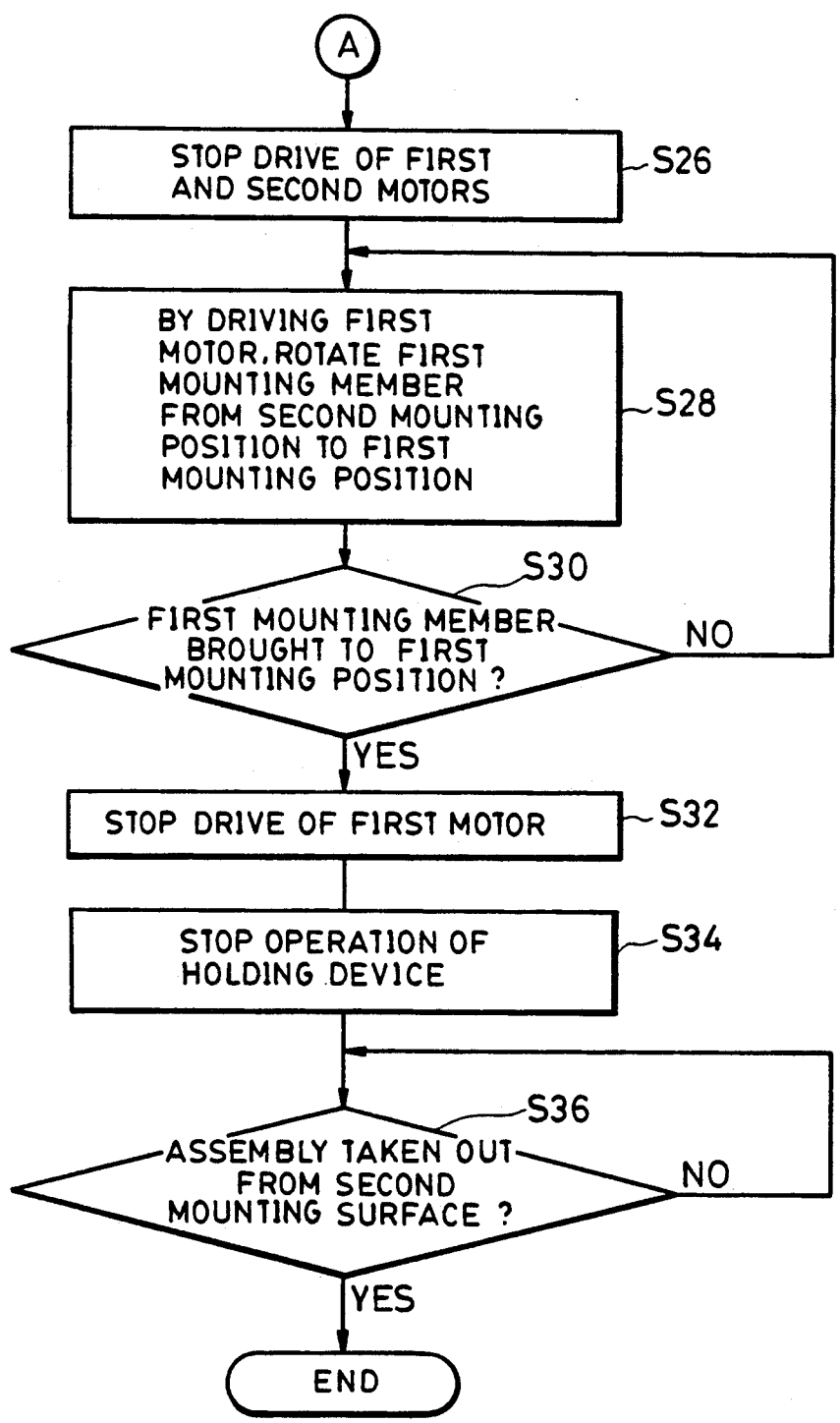

An attitude reversing operation control procedure of the assembly A in the control device 92 will now be explained in detail with reference to the flowchart shown in FIGS. 9(A) and 9(B), and the diagrams of the operation shown in FIGS. 10 through 13.

Figure 10:
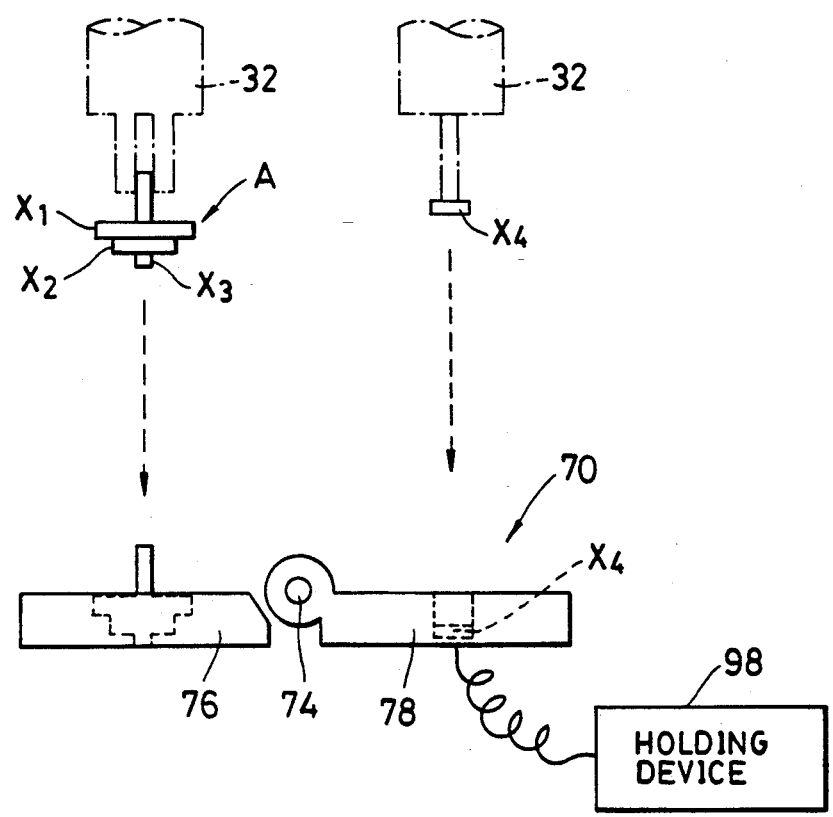

First, as shown in FIG. 10, in a reversing operation waiting state, the first mounting member 76 is positioned at a first mounting position opened in a horizontal state at the left of the rotation support shaft 74 in FIG. 10, and the second mounting member 78 is positioned at a second mounting position rotated and opened in a horizontal state at the right of the shaft 74 in FIG. 10. In other words, in the reversing operation waiting state, the first and second mounting members 76 and 78 are set in a state opened with each other by 180 degrees making the rotation support shaft 74 a center of rotation on the support 72. Accordingly, in this reversing operation waiting state, the first mounting surface 76d of the first mounting member 76 and the second mounting surface 78d of the second mounting member 78 are upwardly opened.

As shown in step S10 in FIG. 9(A), the reversing operation waiting state is continued until it is detected that the assembly A has been mounted on the first mounting surface 76d, and the object $x_4$ has been mounted on the second mounting surface 78d. It is set so that the control device 92 detects the mounted state of the assembly A on the first mounting surface 76d by the fact that the robot 22 receives via its fingers 32 a signal notifying that the assembly A has been fitted within the first recess 80 formed on the first mounting surface 76d, the fingers 32 release the operation of grasping the assembly A, and the pivoting arm 36 of the robot 22 is raised in order to wait above the attitude reversing device 70. It is also set so that the control device 92 detects the mounted state of the object $x_4$ on the second mounting surface 78d by the fact that the robot 22 receives via its fingers 32 a signal notifying that the object $x_4$ has been fitted within the second recess 82 formed on the second mounting surface 78d, the fingers 32 release the operation of grasping the component $x_4$, and the pivoting arm 36 of the robot 22 is raised in order to wait above the attitude reversing device 70.

When the determination at step S10 is "yes", that is, it is detected that the assembly A and the object $x_4$ have been mounted on the first mounting surface 76d and the second mounting surface 78d, respectively, the holding device 98 is started and operated so as to hold the object $x_4$ housed within the second recess 82 in the second mounting surface 78d therein, at the subsequent step S12. Thus, a state in which the object $x_4$ is securely mounted on the second mounting member 78 is maintained no matter to which rotating position the second mounting member 78 rotates. After the start of this holding operation, predetermined processes, such as application of an adhesive and the like, are performed for the upper surface of the object $x_4$, at step S14. (The holding device 98 includes a suction means by a vacuum suction pump, and electrical magnetic means and a pushing insert in a recess of the mounting surface.)

Subsequently, at step S16, by starting the second driving motor 88 so as to rotate in the counterclockwise direction in FIG. 10, the second mounting member 78 situated at the second mounting position is rotated around the rotation support shaft 74 toward the mounting position. If it is detected at step S18 that the second mounting member 78 has been brought to a position superposed on the first mounting member 76 situated at the first mounting position according to a detection signal from the second rotary encoder 96, the drive of the second driving motor 88 is stopped at step S20.

Figure 11:
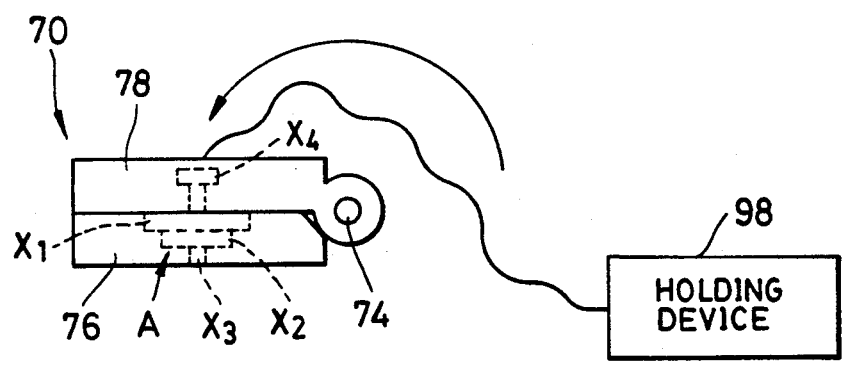

As a result, as shown in FIG. 11, the object $x_4$ held on the second mounting member 78 is mounted above the assembly A mounted on the first mounting surface 76d. In other words, the assembly A and the object $x_4$ assembled therewith are held at the first mounting position in a state sandwiched between the first and second mounting members 76 and 78 in a manner non-demountable therefrom.

Subsequently, step S22 is executed. At step S22, by starting both the first and second driving motors 84 and 88 so as to be driven in the clockwise direction in FIG. 11, both the first and second mounting members 76 and 78 are rotated from the first mounting position toward the second mounting position in a mutually synchronized state, that is, at an identical rotation speed. By this synchronized rotation of the first and second mounting members 76 and 78, the assembly A and the object $x_4$ assembled therewith are rotated from the first mounting position to the second mounting position while maintaining the state sandwiched between the mounting members 76 and 78.

Subsequently, at step S24, when it is detected via the second rotary encoder 96 that the second mounting member 78 has been brought to the second mounting position, the drive of the first and second driving motors 84 and 88 are stopped at step S26.

Figure 12:
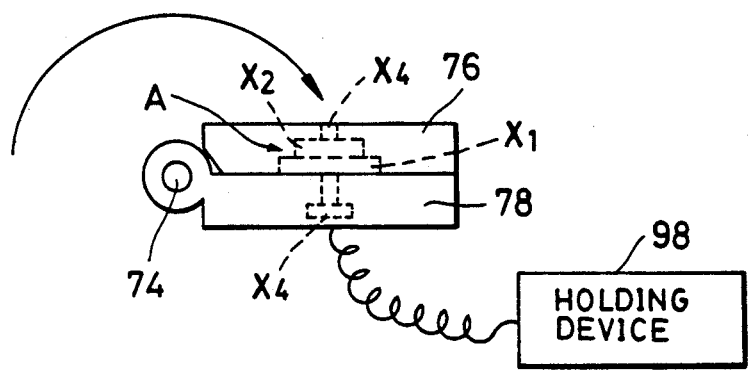

As a result, as shown in FIG. 12, the second mounting member 78 is brought to the second mounting position, and the first mounting member 76 is brought in a state superposed on the second mounting member 78. The assembly A mounted on the first mounting surface 76d is thus mounted on the second mounting surface 78d at the second mounting position. In the state rotated to the second mounting position shown in FIG. 12, the attitude of the assembly A sandwiched between the mounting members 76 and 78 is shifted from the state situated at the first mounting position to the state reversed up and down by 180 degrees. That is, in the state reversed to the second mounting position, the object $x_4$ becomes in a state mounted on the base of the assembly A which has previously been an upper portion.

While processes from step S22 to step S26 are executed, the robot 22 moves the second pivoting arm 36 so that its fingers 32 are positioned immediately above the assembly A brought to the second mounting position.

Subsequently, as shown in step S28, by driving the first driving motor 84 in the counterclockwise direction in FIG. 12, the first mounting member 76 is rotated toward the first mounting position. At step S30, if it is detected via the rotary encoder 94 that the first mounting member 76 has been brought to the first mounting position, the drive of the first driving motor 84 is stopped at step S32. The operation of the holding device 98 is then stopped at the subsequent step S34.

Figure 13:
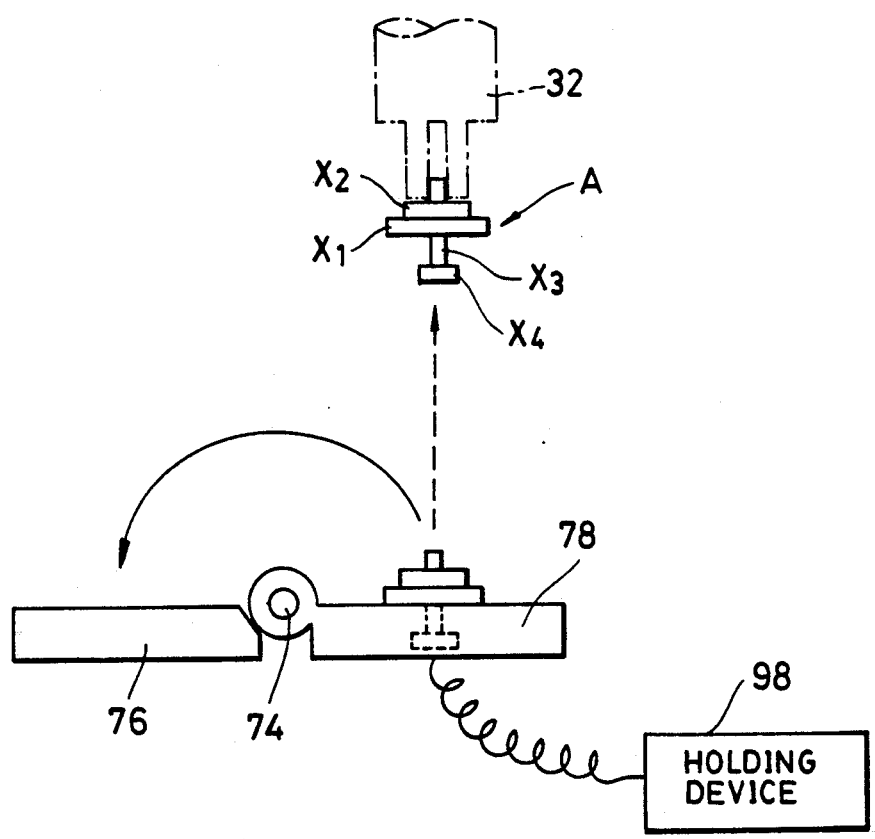
Figure 15A:
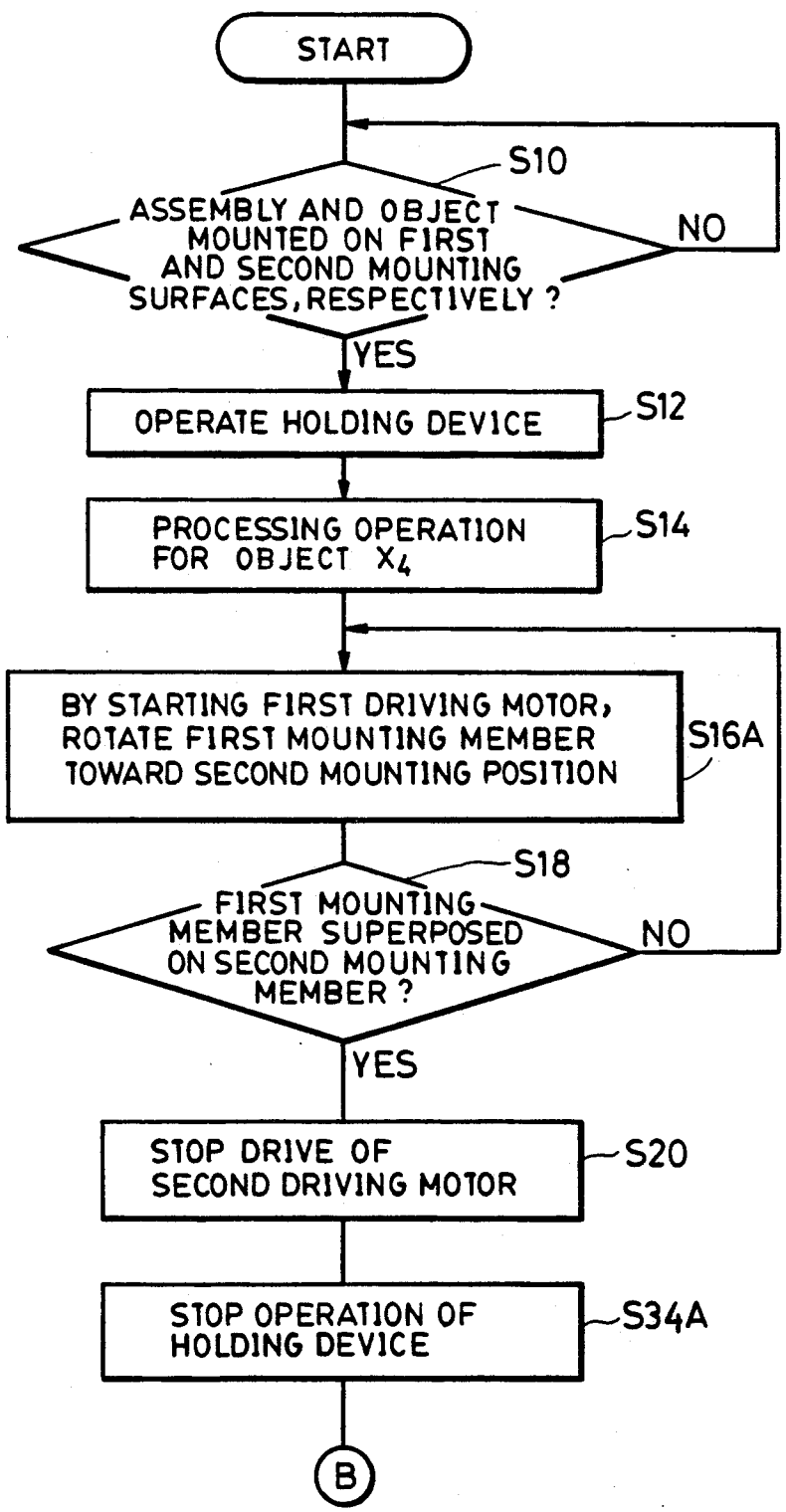
Figure 15:
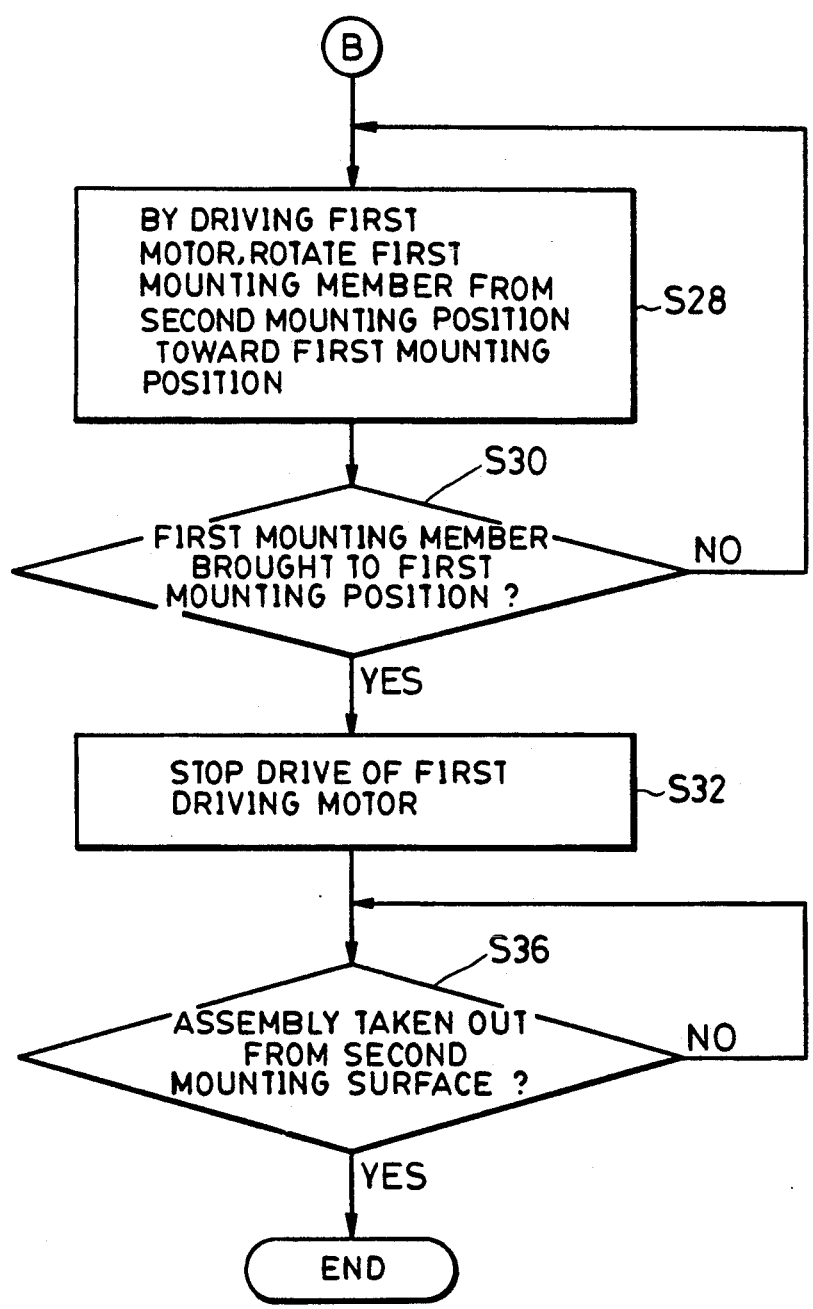

As a result, as shown in FIG. 13, the second mounting surface 78d of the second mounting member 78 situated at the second mounting position is upwardly opened, and the assembly A and the object $x_4$ assembled therewith, the attitude of which has been reversed up and down, become in a state capable of being grasped by the fingers 32 of the robot 22 from above. That is, the assembly A and the object $x_4$ return to the reversing operation waiting position in the attitude reversing device 70. It is to be noted that the object $x_4$ adheres to the assembly A by the adhesive applied at the processing of step S14, and the assembly A and the object $x_4$ are in a mutually non-demountable state.

At step S36, by confirming by a signal from the robot 22 that the assembly A fitted within the second recess 82 formed on the second mounting surface 78d has been taken out by the fingers 32 of the robot 22, a series of attitude reversing operation control processes are terminated, and the above-described reversing operation waiting state is set again.

The assembly A grasped by the fingers 32 is housed again in the jig 24 for assembling operation in a state in which its attitude is reversed up and down from the attitude when it has been brought to the attitude reversing device 70. That is, in the state in which the assembly A is returned and housed in the jig 24 for assembling operation, a portion which has previously been the base of the assembly A becomes its upper portion. Thus, in the jig 24 for assembling operation, an assembling operation of another object on the portion which has previously been the base of the assembly A can easily been executed.

That is, in the attitude reversing device 70 of the present embodiment, the attitude of the assembly A grasped and taken out from the second mounting surface 78d by the fingers 32 of the robot 22 is set in a state in which the attitude of the assembly A when mounted on the first mounting surface 76a by the fingers 32 is reversed up and down by 180 degrees. Thus, in the present embodiment, it becomes possible to reverse the attitude of the assembly A in a state reversed up and down by 180 degrees within a short time by using the attitude reversing device 70, without using two robots.

Furthermore, in the attitude reversing device 70 of the present embodiment, while the assembly A is rotated around the rotation support shaft 74 in order to change its attitude up and down by 180 degrees, the assembly A and the object $x_4$ assembled therewith are maintained in the state sandwiched between the first and second mounting members 76 and 78. Hence, during this reversing operation, the attitude reversing operation can be securely executed without disassembling the relative attitude between the assembly A and the object $x_4$ in the course of the assembling operation.

In the present embodiment, there may occur a case in which the assembling operation of the object $x_4$ with the assembly A is excuted by, for example, a pressing-in operation without using an adhesive. In order to execute such a pressing-in operation, the thrust of the fingers 32 of the robot 22 alone is sometimes insufficient as the operation force for that purpose. However, by utilizing the attitude reversing operation in such an attitude reversing device 70, the object $x_4$ can be mounted in a state securely pressed in the rotation shaft $x_3$ of the assembly A.

Furthermore, in the present embodiment, in a case in which the assembling operation on the first mounting surface 76d and the assembling operation on the second mounting surface 78d can be executed by different robots, it is possible to shorten the total time for an assembling operation.

The present invention is not limited to the configuration of the above-described embodiment, but various changes and modifications may, of course, be made without departing from the spirit and scope of the invention.

For example, although, in the above-described embodiment, an explanation has been provided of a case in which the assembly A is assembled from the gears $x_1$ and $x_2$ having large and small diameters, respectively, and coaxially provided in parallel to each other, and the rotation shaft $x_3$ coaxially passing through them, the present invention is not limited to the reversing operation of such an assembly A, but can reverse the attitude of an assembly having any configuration up and down by 180 degrees.

In addition, although, in the above-described embodiment, an explantion has been provided of a case in which the holding operation by the holding device 98 is stopped after the stop operation of the drive of the first driving motor 84 at step S32, the present invention is not limited to such a configuration, but the holding operation may, for example, be stopped at any time after the stop operation of the drive of the second driving motor 88 at step S20.

Furthermore, although, in the above-described embodiment, an explanation has been provided of a case in which the driving motors are adopted as driving means for rotating the first and second mounting members 76 and 78, the present invention is not limited to such a configuration, but, for example, hydraulic cylinders, electromagnetic solenoids or the like may, of course, be used.

Moreover, although, in the above-described embodiment, an explanation has been provided of a case in which the holding device 98 is connected to the second mounting member 78, the present invention is not limited to such a configuration, but the holding device 98 may, for example, be connected to the first mounting member 76 to hold the assembly A mounted thereon, as shown as another embodiment in FIG. 14. Due to thus changing the connecting position of the holding device 98, the attitude reversing operation becomes different from the control procedure shown in FIGS. 3(A) and 3(B). A control procedure in the control device 92 for reversing the attitude of the assembly in the other embodiment will now be explained with reference to FIGS. 15(A) and 15(B). In the following explanation, the same steps as in the foregoing embodiment are indicated by the same numerals, and an explanation thereof will be omitted.

First, at step S12 after step S10 has been executed, the operation of the holding device 98 is started as in the foregoing embodiment. In the present embodiment, however, the assembly A is held on the first mounting member 76 in accordance with the start of the operation of the holding device 98. When a predetermined processing operation for the object $x_4$ has been performed at step S14, the first driving motor 84 is started at step S16A, where the first mounting member 76 is rotated toward the second mounting position.

When step S20 has been executed, the assembly A held on the first mounting member 76 is assembled, in a state in which its attitude is reversed up and down, from above with the object $x_4$ mounted on the second mounting surface 78d at the second mounting surface, as shown in FIG. 12. In other words, the assembly A and the object $x_4$ assembled therewith are held at the second mounting position in a state sandwiched between the first and second mounting members 76 and 78.

After step S20 has been executed, the operation of the holding device 98 is stopped, as shown at step S34A, and step S28 is then executed. After the execution of steps S30 and S32, the first mounting member 76 is returned to the first mounting position in a state leaving the assembly A at the second mounting position. Thus, as shown in FIG. 13, the assembly A, the attitude of which is reversed up and down, and the object $x_4$ assembled therewith are left mounted on the second mounting member 78 situated at the second mounting position. After the execution of step S32, step S36 is directly executed, and the control procedure is thus terminated.

Thus, in the present embodiment, by switching the substance to be held from the object $x_4$ to the assembly A, it becomes possible to execute the reversing operation control procedure in a simplified state.

As described above in detail, an attitude reversing method for reversing up and down an attitude of an assembly consisting of a plurality of objects in course of assembling operation while assembling another object with the assembly according to the present invention is characterized in that it comprises a setting step for setting first and second mounting surfaces of a jig for reversing operation at first and second mounting positions opened with each other by about 180 degrees, respectively, a mounting step for mounting the assembly on the first mounting surface set at the first mounting position and for mounting the object on the second mounting surface set at the second mounting position, a superposing step for superposing the second mounting surface on the first mounting position, while holding the object on the second mounting surface, to assemble the object with the assembly, and a reversing step for reversing the entire jig for reversing operation, while maintaining the state in which the first and second mounting surfaces are superposed with each other, to set the jig for reversing operation on the second mounting position.

The attitude reversing method is also characterized in that it further comprises a returning step for returning the first mounting surface to the first mounting position to open the second mounting surface, and a stopping step for stopping the holding operation of the object.

According to another aspect of the present invention, an attitude reversing method for reversing up and down an attitude of an assembly consisting of a plurality of objects in course of assembling operation while assembling another object with the assembly according to the present invention is characterized in that it comprises a setting step for setting first and second mounting surfaces of a jig for reversing operation at first and second mounting positions opened with each other by nearly 180 degrees, respectively, a mounting step for mounting the assembly on the first mounting surface set at the first mounting position and for mounting the object on the second mounting surface set at the second mounting position, and a reversing and superposing step for superposing the first mounting surface on the second mounting surface in a reversed state, while holding the object on the first mounting surface, to assemble the object with the assembly.

The attitude reversing device is also characterized in that it further comprises a stopping step for releasing the holding operation of the assembly after the reversing and superposing step, and a returning step for returning the first mounting surface to the first mounting position to open the second mounting surface.

According to another aspect of the present invention, an attitude reversing device for reversing up and down an attitude of an assembly consisting of a plurality of objects in course of assembling operation while further assembling another object with the assembly is characterised in that it comprises a jig for reversing operation rotatably having first and second mounting surfaces and capable of mounting the assembly and the object on the first and second mounting surfaces, respectively, first driving means for reciprocating the first mounting surface between a first mounting position and a second mounting position opened with each other by about 180 degrees, second driving means for reciprocating the second mounting surface between the second mounting position and the first mounting position, and holding means provided at one of the first and second mounting surfaces and for holding a corresponding assembly or object.

The attitude reversing device is also characterized in that the holding means is connected to the first mounting surface and holds the assembly mounted thereon.

The attitude reversing device is also characterized in that the holding means is connected the second mounting surface and holds the object mounted thereon.

Hence, according to the present invention, attitude reversing method and attitude reversing device are provided which can securely reverse the attitude of an assembly in course of assembling operation within a short time while asembling another object therewith.

Figure 17:
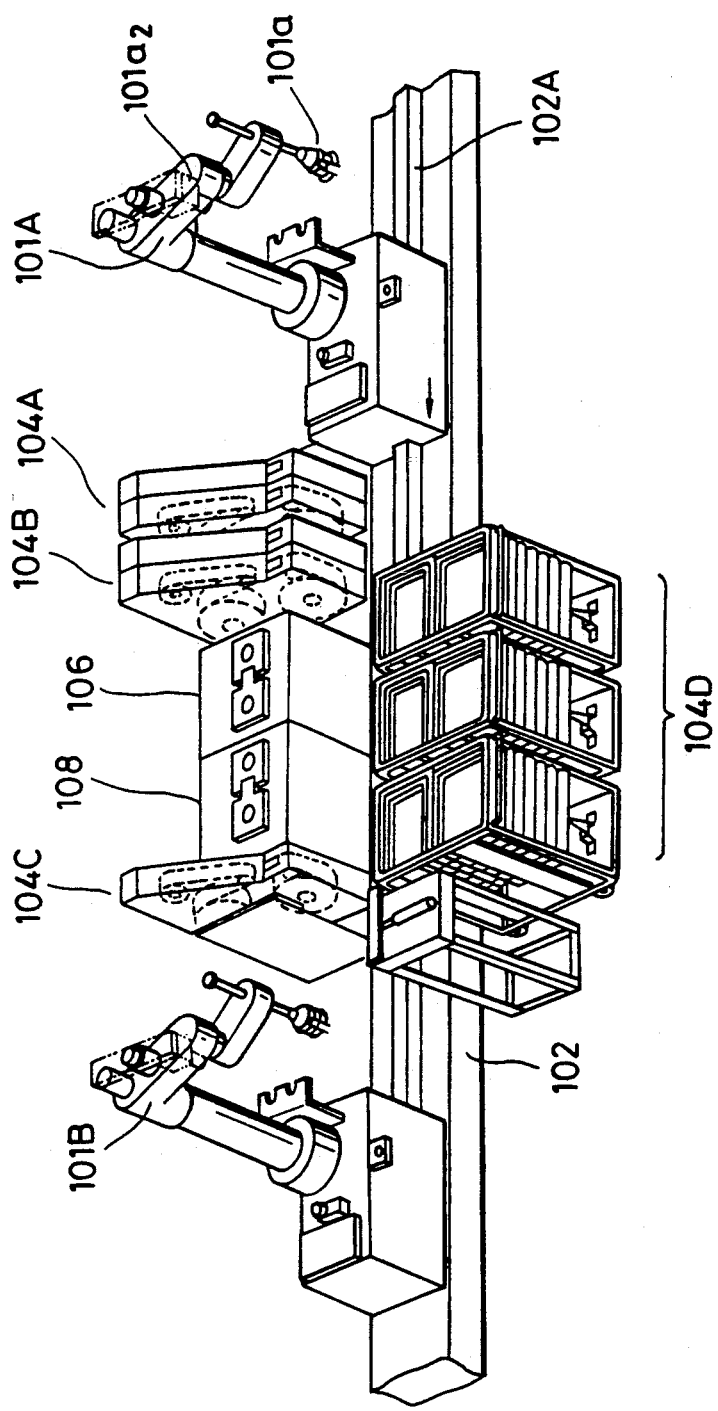
FIGS. 17 through 20 show a third embodiment of the present invention.
Figure 18:
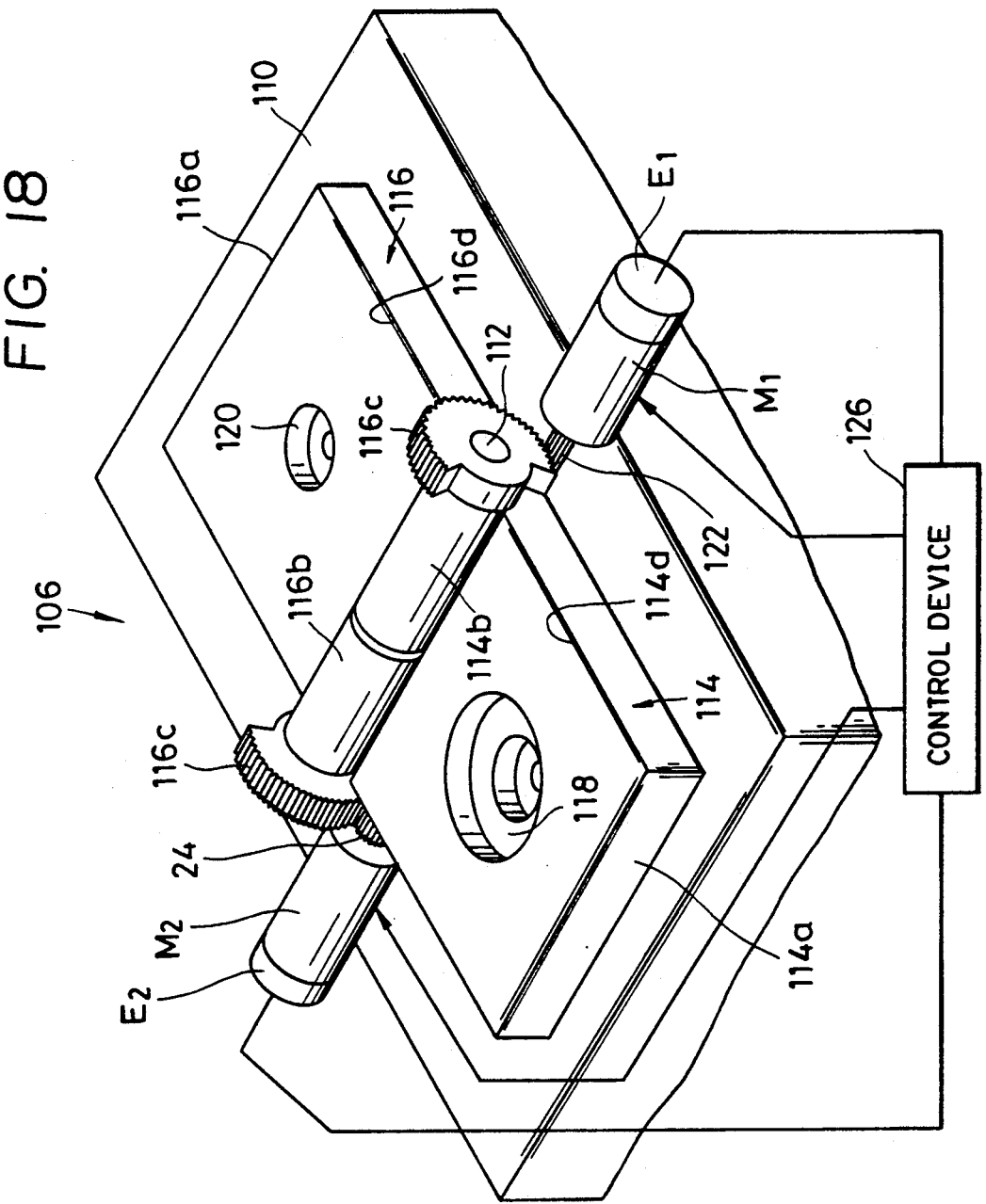

FIGS. 17 and 18 are an assembling apparatus and an attitude reversing device according to a third embodiment of the present invention.

In FIG. 17, there are shown assembling robots 101A and 101B, which move on a guide rail 102A mounted on a base 102. On the running path of the first robot 101A, object supply means 104A, 104B, 104C,—for supplying a plurality of objects are arranged along the above-described guide rail 102A. Adjacent to the object supply means 104B are disposed attitude reversing devices 106 and 108, the detailed configuration of which is shown in FIG. 18.

In FIG. 17, the first robot 101A situated at the right end runs on the guide rail 102A in the direction of the arrow in accordance with a command from a control system (not shown), and stops at a position capable of picking up supply objects from the first object supply means 104A and the second object supply means 104B. A robot hand 101a picks up the shafted gear $G_2$ shown in FIG. 16 from the first object supply means 104B, and houses it in an object housing portion in a first mounting member of the first attitude reversing device 106.

Subsequently, the robot hand 101a picks up the spur gear $G_1$ shown in FIG. 16 from the second object supply means 104B, and houses it in an object housing portion in a second mounting member of the first attitude reversing device 106.

The first attitude reversing device 106 then performs the operation reversed to the left or to the right as shown in FIG. 16(A), and assemblies together the gears $G_1$ and $G_2$ as shown in FIG. 16(B) or 16(C), respectively.

The objects $(G_1+G_2)$ assembled in the first attitude reversing device 106 are taken out from the first attitude reversing device 106 by the second robot 101B, which houses them in an object housing portion in a first mouting member of the second attitude reversing device 108. The second robot 101B further picks up an object $G_3$ (not shown) from the third object supply means 104C, and houses it in an object housing portion in a second mounting member of the second attitude reversing device 108.

The third object $G_3$ is assembled with the objects $(G_1+G_2)$ assembled in the first attitude reversing device 106 by the reversing operation of the second attitude reversing device 108. In this operation, according to whether or not the attitude of the objects $(G_1+G_2)$ after the reversing operation of the first attitude reversing device 106 explained in FIG. 16 is suitable for assembling the third object $G_3$, the objects $(G_1+G_2)$ assembled in the first attitude reversing device 106 may be housed as they are within the object housing portion in the first mounting member of the second attitude reversing device 108, or the attitude of the objects $(G_1+G_2)$ must be changed between the first attitude reversing device 106 and the second attitude reversing device 108.

In the present invention, the first robot 101A mounts a CCD camera $101a_2$, serving as a recognition means for recognizing object information, on its arm. When the first robot 101A picks up the objects $G_1$ and $G_2$ from the first and second object supply means 104A and 104B, respectively, it reads respective recognition information $g_1$ and $g_2$ indicated on the objects $G_1$ and $G_2$, and controls the reversing direction of the first attitude reversing device 106 according to the recognition information $g_1$ and $g_2$.

Next, the configuration of the first and second attitude reversing devices will be explained.

As shown in FIG. 18, the attitude reversing device 106 includes a support 110 mounted on a base (not shown), and one rotation support shaft 112 horizontally extending on the support 110. A pair of mounting members 114 and 116 are rotatably supported on the support 110 making the rotation support shaft 112 a common center of rotation. That is, the first mounting member 114 is formed, in one body, by a first main body portion 114a formed in the shape of a nearly flat plate, a first pivoting portion 114b provided only at a portion corresponding to the front-side half in FIG. 18 of the rotation support shaft 112 and pivoted by the rotation support shaft 112, and a first gear portion 114c coaxially mounted at the front side in FIG. 18 of the first pivoting portion 114b.

On the other hand, the second mounting member 116 is formed, in one body, by a secon main body portion 116a formed in the shape of a nearly flat plate, a second pivoting portion 116b provided only at a portion corresponding to the rear-side half in FIG. 18 of the rotating support shaft 112 and pivoted by the rotating support shaft 112, and a second gear portion 116c coaxially mounted at the rear side in FIG. 18 of the second pivoting portion 116b.

As shown in FIG. 18, the first and second mounting members 114 and 116 are positioned at a mounting position and a reversed position, respectively, in a state opened by 180 degrees with each other on the support 110. In the state in which the first and second mounting members 114 and 116 are positioned on the mounting position and reversed position, respectively, first and second mounting surfaces 114d and 116d are defined by the upper surfaces of the respective members.

On the first mounting surface 114d, a first recess 118 is formed in which the lower portion of the above-described assembly A, that is, the lower portion of the rotation shaft $x_3$, the gear $x_2$ having a small diameter and the gear $x_1$ having a large diameter are to be fitted. On the other hand, on the second mounting surface 116d, a second recess 120 is formed in which the upper portion of the assembly A, that is, the upper portion of the rotation shaft $x_3$ is to be fitted. In a state in which the first and second mounting members 114 and 116 are superposed one above another, the entire assembly A is non-demountably held in a state fitted within the two recesses 118 and 120, that is, in a state sandwiched between the two mounting members 114 and 116.

A first reversibly rotatable driving motor $M_1$ is disposed in order to rotatably drive the first mounting member 114. A first driving gear 122 meshing with the above-described first gear 114c is mounted on the driving shaft of the first driving motor $M_1$ in a manner forming one body. Furthermore, a second reversibly rotatable driving motor $M_2$ is disposed in order to rotatably drive the second mounting member 116. A second driving gear 124 meshing with the above-described second gear portion 116c is mounted on the driving shaft of the second driving motor $M_2$ in a manner forming one body.

The first and second driving motors $M_1$ and $M_2$ are connected to a control device 126 for controlling their driving state. The control device 126 is configured so as to output control signals to the first and second driving motors $M_1$ and $M_2$ in order to perform a reversing operation to reverse up and down the attitude of the assembly A according to a control procedure previously set in the control device 126. The first and second driving motors $M_1$ and $M_2$ mount rotary encoders $E_1$ and $E_2$ for detecting the amounts of rotation drive by the respective motors. The control device 126 detects current positions of the first and second mounting members 114 and 116 according to detection results by the rotary encoders $E_1$ and $E_2$.

Figure 19:
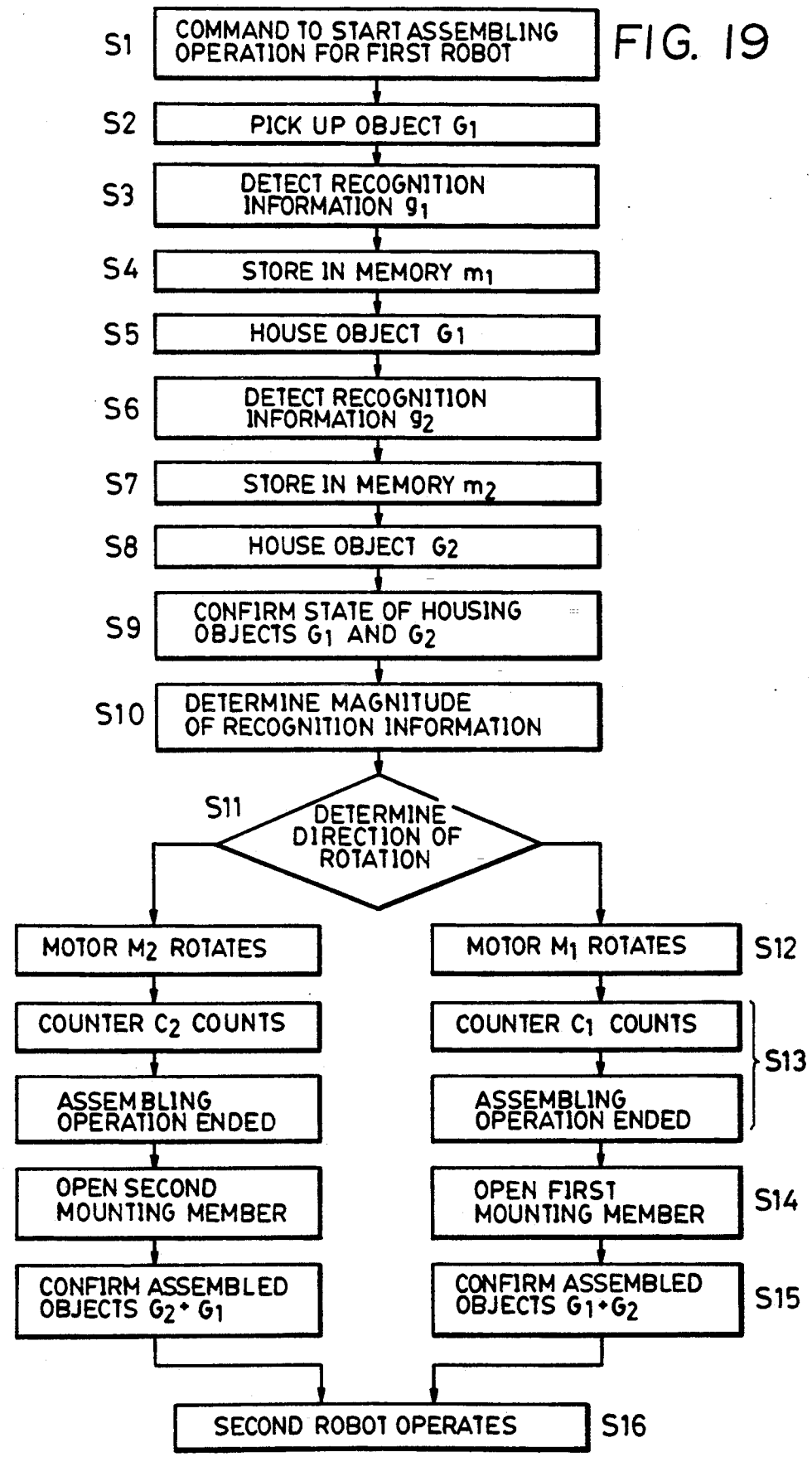
Figure 20:
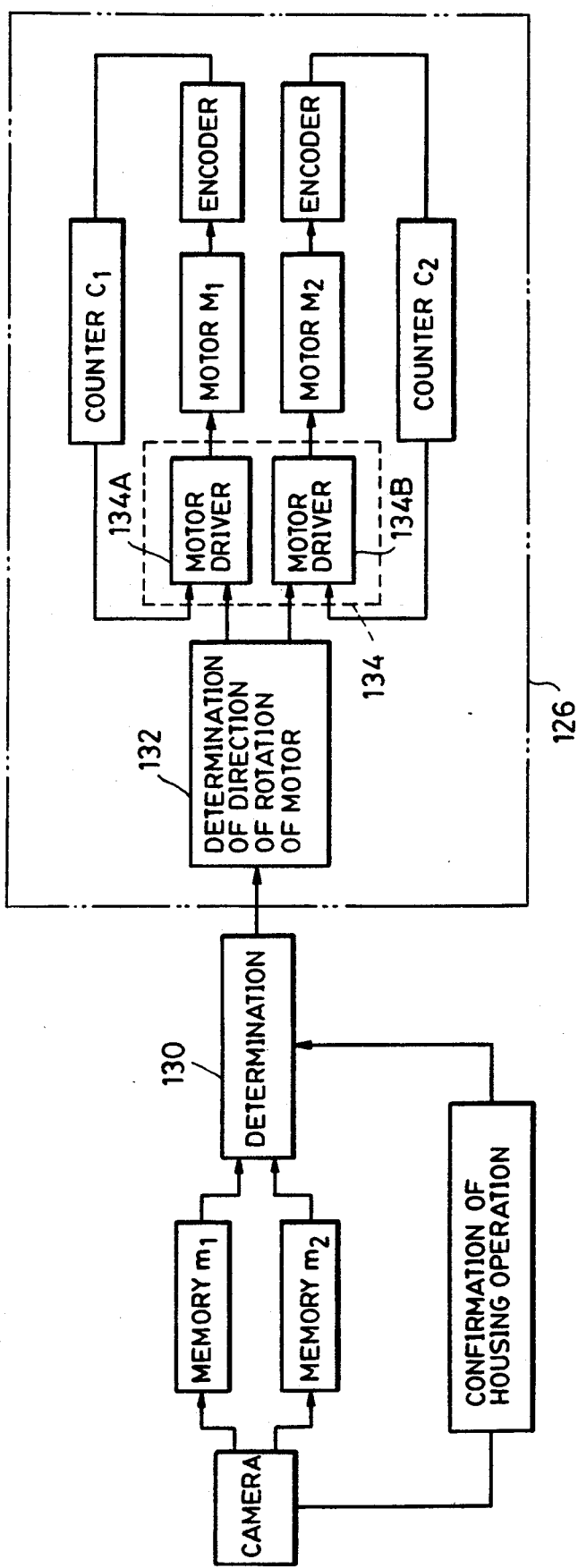

Next, an explanation will be provided with reference to the flowchart of the operation shown in FIG. 19 and the block diagram shown in FIG. 20.

First, a command to start the assembling operation of the objects is issued from a control unit (not shown) for the first robot 101A, and the first robot 101A moves to positions capable of picking up the objects $G_1$ and $G_2$ from the first and second object supply means 104A and 104B, respectively, in accordance with the command (step S1).

The first robot 101A then picks up the object $G_1$ by the robot hand according to a command for picking up the object $G_1$ (step S2).

During this picking-up operation, the recognition information $g_1$ provided on the object $G_1$ is read by the CCD camera mounted on the robot arm (step S3).

The object recognition information $g_1$ is provided by the number $h_1$ of holes provided on the object $G_1$, and the number $h_1$ of holes recognized by the CCD camera is input to a first memory $m_1$ shown in FIG. 20 via the control unit of the robot (step S4). When the detection of the recognition information by the CCD camera has been ended, the object $G_1$ is housed within the first object housing portion 118 of the first attitude reversing device 106 by the first robot 101A (step S5).

The first robot 101A then picks up the second object $G_2$ from the second object supply means 104B, and the recognition information $g_2$ of the object $G_2$ is read by the CCD camera during this picking-up operation (step S6).

In addition, $h_2$ holes, serving as peculiar information, are also perforated on the object $G_2$. The CCD camera reads the number $h_2$ of holes, and the recognized information $g_2$ is input to a second memory $m_2$ (step S7). The object $G_2$ picked up by the first robot 101A is housed within the second object housing portion 120 of the first attitude reversing device 106 (step S8).

After the objects $G_1$ and $G_2$ have been housed in the first and second object housing portions 118 and 120 by the first robot 101A, respectively, the state of housing the objects $G_1$ and $G_2$ is confirmed by the CCD camera in the first robot 101A (step S9).

After the confirmation at step S9 has been performed, the respective recognition information $g_1$ and $g_2$ stored in the memories $m_1$ and $m_2$ are read by a determination means 130, and the determination of the magnitude of the numbers $h_1$ and $h_2$ of holes on the respective objects is performed (step S10).

The information as a result of the determination by the determination means 130, for example the information $h_1 > h_2$ indicating that the number $h_1$ of holes on the object $G_1$ is larger, is input to a means 132 for determining the direction of rotation of a motor (step S11). The rotation direction determination means 132 outputs a signal to a motor driver 134 according to the determination result $h_1 > h_2$.

The motor driver 134 comprises a motor driver 134A for driving the first motor $M_1$ and a motor driver 134B for driving the second motor $M_2$, and controls a starting signal for the motor driver 134A or 134B in accordance with a signal from the rotatation direction determination means 132.

As a result of the determination at step S10, a current is supplied for the motor driver 134A by the rotation direction determination means 132 to rotate the motor $M_1$. The first mounting member 114 thereby rotates in the right direction around the shaft 112, and the operation of assembling the object $G_1$ above the object $G_2$ is performed (step S12). The encoder $E_1$ is connected to the rotating shaft of the first motor $M_1$, and pulse signals from the encoder $E_1$ are counted. When the counted number of signals reaches a predetermined value, it is determined that the first mounting member 114 has been superposed at a predetermined position on the second mounting member 116. That is, it is determined that the spur gear, the object $G_1$, has been fitted in the shaft portion of the shafted gear, the object $G_2$, and the assembling operation has been completed (step S13).

When a count-ending signal is output from a counter $C_1$ for counting signals from the encoder $E_1$, the current supply for the motor driver 134A is switched to open the first mounting member 114 (step S14). The operation for opening the first mounting member 114 at step S14 is performed by supplying the motor driver 134A with a current opposite to that when closing it for a predetermined time.

When the opening operation at step S14 has ended, the CCD camera in the robot 101A confirms the objects $G_1+G_2$ assembled on the second mounting member 116 (step S15). This confirmation operation is performed by detecting a mark or a signal provided on the base of the object $G_1$. That is, on the base of the object $G_1$ (the base of the object $G_1$ in a state housed in the first object housing portion 118), a mark $g_{2a}$ indicating the base of the object $G_1$ is provided.

When the mark $g_{2a}$ is recognized by the CCD camera after the end of the operation at step S14, it is determined that the object $G_1$ has been assembled on the object $G_2$, and an assembling operation completion signal is transmitted from the control unit of the first robot 101A to the control unit of the second robot 101B (step S16).

The control unit of the second robot 101B executes the subsequent assembling operation by the second attitude reversing device 108 in accordance with the assembling operation completion signal from the first robot 101A.

When the result of the determination of the recognition information $h_1$ and $h_2$ at the above-described step S10 is $h_2 > h_1$, a starting signal for the second motor driver 134A is transmitted from the rotation direction determination means 132, and the motor $M_2$ thereby rotates to rotate the second mounting member 116 in the left direction around the shaft 112. As a result, the object $G_2$ is assembled on the object $G_1$.

Although, in the above-described embodiment, an explanation has been provided of a case in which the numbers $h_1$ and $h_2$ of respective holes perforated on the objects $G_1$ and $G_2$ as respective recognition information $g_1$ and $g_2$ are read by the CCD camera, any other information may be used as the recognition information. For example, reflective mark sheets may be attached on the surfaces of the objects $G_1$ and $G_2$, light-emitting devices and photosensors may be disposed in the robots, luminance signals converted from reflected light beams after projecting light beams upon the mark sheets may be input in the memories $m_1$ and $m_2$ shown in FIG. 20, and the direction of rotation of a motor may be determined by the magnitude of the luminance signals.

Figure 21:
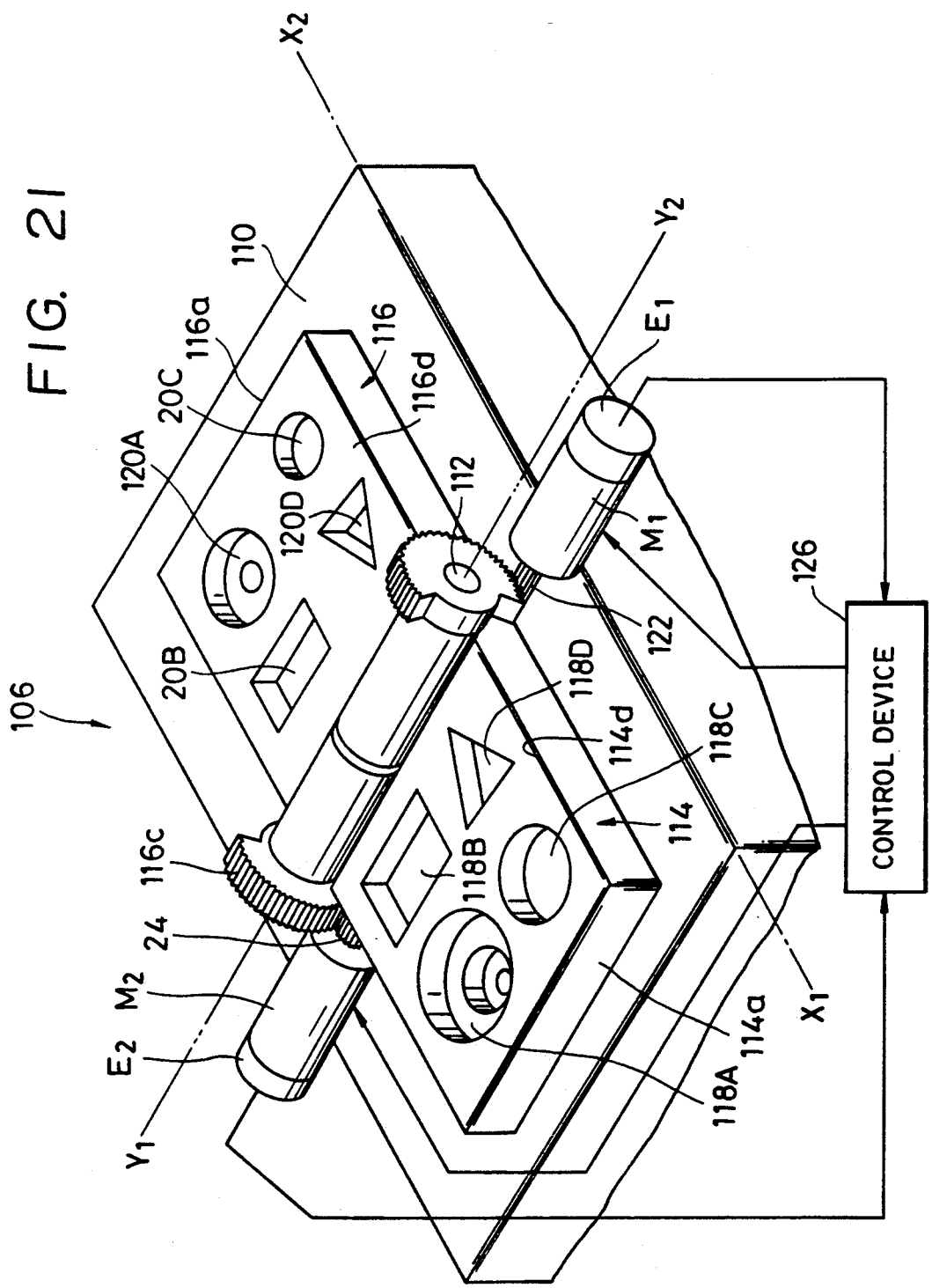
FIGS. 21 and 22 show a fourth embodiment of the present invention.
Figure 22:
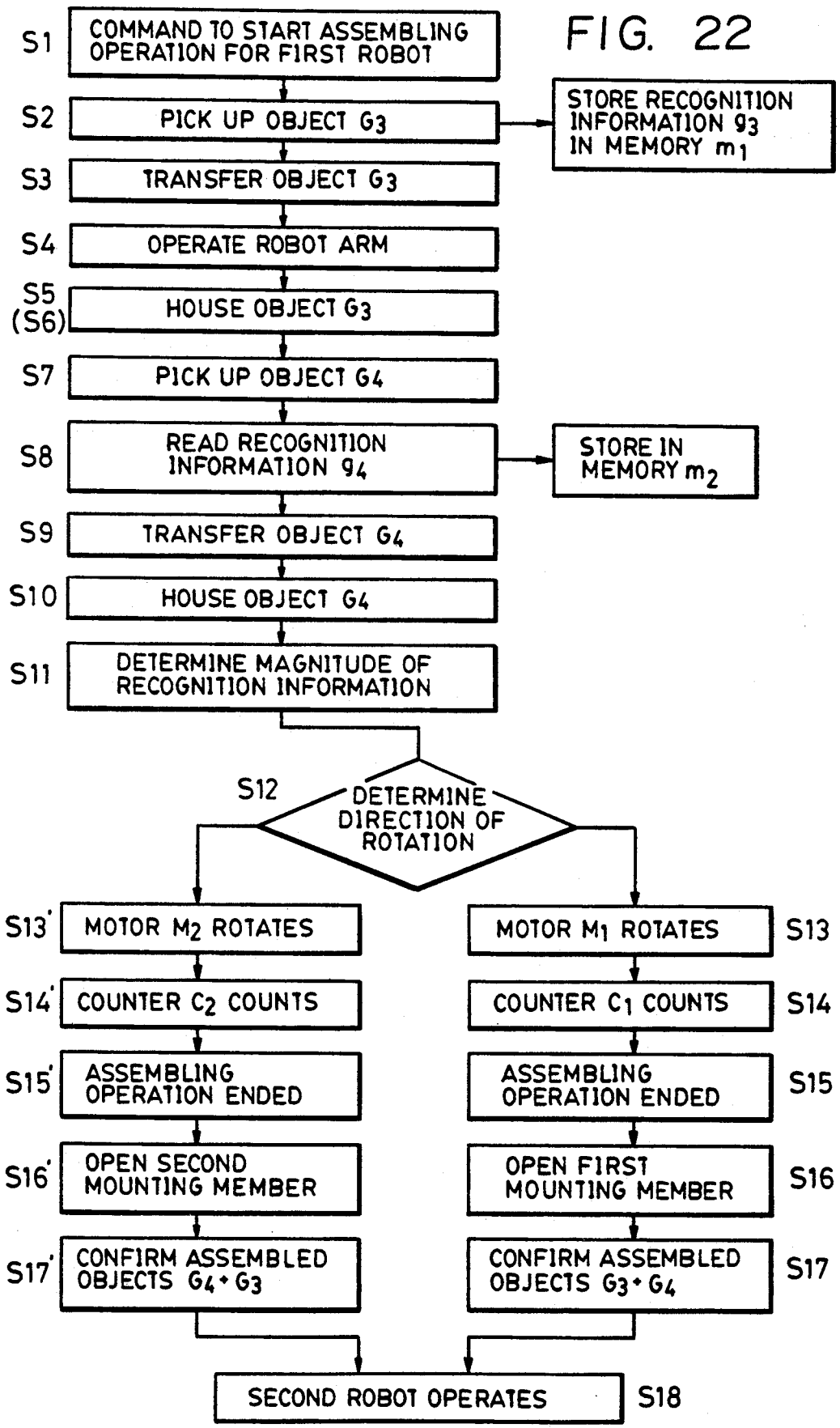

FIGS. 21 and 22 show still another embodiment of the present invention. In the present embodiment, the first and second mounting members 114 and 116 of the attitude reversing device shown in the above-described embodiment are provided with general applicability so that objects having different shapes can be mounted on a single mounting member. Furthermore, a plurality of object housing portions are formed, and the reversing direction of the mounting member is controlled by determining in which of the plurality of object housing portions a certain object has been housed.

An explanation will now be provided with reference to FIGS. 21 and 22.

FIG. 21 shows the attitude reversing device used in the present embodiment, which has the same configuration as the attitude reversing device shown in FIG. 18 except the shapes of object housing portions in the first and second mounting members 114 and 116.

Object housing portions 118A, 118B, 118C and 118D, and 120A, 120B, 120C and 120D capable of housing a plurality of objects are formed in the mounting members 114 and 116 in the present embodiment, respectively. The object housing portion 118A in the first mounting member 114 and the object housing portion 120A in the second mounting member 116 have the same relationship as the object housing portions 118 and 120 in the above-described third embodiment, and assemble objects (not shown) housed in the respective portions. The other object housing portions are arranged so that the portions 118B and 120B, 118C and 120C, 118D and 120D assemble objects in the respective portions.

Each object housing portion has its address. When the reference position surface $X_1$-$X_2$ of the support 110 and the central axis $Y_1$-$Y_2$ of the shaft 112 are made X and Y coordinates, respectively, the positions of central points of the respective object housing portions from the origin $(X_0, Y_0)$ are represented by $(X_{118A}, Y_{118A})$ for 118A, $(X_{118B}, Y_{118B})$ for 118B, $(X_{118C}, Y_{118C})$ for 118C, $(X_{118D}, Y_{118D})$ for 118D, $(X_{120A}, Y_{120A})$ for 120A, $(X_{120B}, Y_{120B})$ for 120B, $(X_{120C}, Y_{120C})$ for 120C, and $(X_{120D}, Y_{120D})$ for 120D.

The operation of the present embodiment will now be explained also with reference to the flowchart shown in FIG. 22.

First, a command to start assembling operation is issued for the first robot 101A situated at the position (robot's start position) shown in FIG. 17 (step S1).

In the present embodiment, it is arranged so that object supply means $104A_1$, $104A_2$, $104B_1$ and $104B_2$ can supply four objects $G_1$-$G_4$. Objects to be supplied from the four object supply means are previously determined, and the objects programmed to be assembled (assumed to be $G_3$ and $G_4$) are supplied to the first robot 101A. The first robot 101A picks up the first object $G_3$ from the corresponding supply means in accordance with the determined program (step S2). The first robot 101A moves in the direction of the attitude reversing device while holding the object $G_3$, and then stops (step S3).

The first robot 101A reads out from the program to which of the four object mounting portions 118A, 118B, 118C and 118D in the first mounting member 114 the object $G_3$ picked up according to the determined program is to be housed, and operates the robot's arm so that the coordinate of the object $G_3$ corresponds to the the above-described coordinate of the corresponding housing portion (step S4).

By the descent along the z axis of the robot's hand holding the object $G_3$ the coordinate of which coincides with the position coordinate of the object housing portion (for example 118C) in which the object $G_3$ is to be housed, the object $G_3$ is housed within the object housing portion 118C (step S5).

The movement of the object $G_3$ to the object housing portion at the above-described step S4 may be performed by recognizing a mark signal indicated on the object $G_3$ by the CCD camera to obtain recognition information $g_3$, while the information of the position coordinate of the object housing portion, in which the object $G_3$ is to be housed, corresponding to the recognition information $g_3$ has been recorded in a memory, and by reading the position coordinate corresponding to the recognition information $g_3$ from the memory to operate the robot's arm (step S6).

When the first object has been housed as described above, the first robot 101A moves again to the position of the supply means for supplying the second object. The first robot picks up the second object $G_4$ at that position (step S7). The CCD camera then reads a mark indicated on the object $G_4$, and reads out the coordinate information $(X_{20c}, Y_{20c})$ of the object housing portion 20C corresponding to the recognition information $g_4$ from the above-described memory (step S8).

The first robot 101A moves in the direction of the attitude reversing device while holding the object $G_4$, then stops at a predetermined position, and controls so as to move the robot's arm to the position of the above-described coordinate (step S9).

When the coordinate of the position of the robot's arm coincides with the coordinate of the object housing portion 120C, the object $G_4$ is housed within the object housing portion 120C by the robot's hand (step S10).

The respective recognition information $g_3$ and $g_4$ of the objects $G_3$ and $G_4$ may be the information of the number h of holes, as described in the forgoing third embodiment, or luminance signals. When the recognition information $g_3$ and $g_4$ is the above-described information of the number of holes, the respective information is input to the memories $m_1$ and $m_2$ when reading the recognition information at the above-described steps S2 and S8.

When the above-described step S10 has ended, the objects $G_3$ and $G_4$ become in a state housed in the respective object housing portions. Subsequently, the confirmation of the state of housing the objects $G_3$ and $G_4$ is performed by the CCD camera, and the determination of the magnitude of the recognition information housed in the memories $m_1$ and $m_2$ is then performed (step S11).

Subsequently, the determination of the direction of rotation is performed, and the assembling operation of the objects $G_3$ and $G_4$ by the reversing operation of the first (second) mounting member by the motor $M_1$ ($M_2$) is then performed, as shown in FIG. 22.

As described above, according to the present invention, in which the control of the reversing direction is performed in accordance with the information of the object to be assembled, by previously providing the above-described recognition information $g_1$, $g_2$,—on respective objects, the determination of the reversing direction can be made by the assembly apparatus itself, and hence it becomes possible to promote automation of the assembling operation and economization of man power.

What is claimed is:

1. An assembly-attitude reversing method for assembling a plurality of objects and for reversing up and down an attitude of the assembly comprising the steps of:

positioning a first mounting member having a first mounting surface and a second mounting member having a second mounting surface in a waiting state;

setting a first object and a second object on said first and second mounting surfaces of said first and second mounting members in said waiting state respectively, said first and second mounting surfaces respectively hold said first and second objects;

superposing said first mounting surface having said first object set thereon on said second mounting surface having said second object set thereon while maintaining said first object set to said first mounting surface in a holding state thereby obtaining an assembly by combining said first object and said second object;

reversing said superposed first and second mounting members in synchronized rotation thereby positioning said second object set in said second mounting surface over said first object set in said first mounting surface;

opening said second mounting member while maintaining said assembly of said first and second objects on said first mounting member in the holding state; and picking up said assembly from said first mounting member.

2. The method according to claim 1, wherein said object setting step further comprises a preparing step for preparing to connect said first and second objects.

* * * * *

UNITED STATES PATENT AND TRADEMARK OFFICE
CERTIFICATE OF CORRECTION

PATENT NO. : 5,182,843

DATED : February 2, 1993

INVENTOR(S) : SACHIO UMETSU, ET AL.

It is certified that error appears in the above-identified patent and that said Letters Patent is hereby corrected as shown below:

COLUMN 1

Line 45, "surface" should read --surfaces--.

COLUMN 5

Line 9, "rotably" should read --rotatably--.

COLUMN 15

Line 42, "terised" should read --terized--.
Line 59, "connected" should read --connected to--.

COLUMN 16

Line 27, "assemblies" should read --assembles--.
Line 33, "mout-" should read --mount- --.

COLUMN 17

Line 15, "secon" should read --second--.

COLUMN 18

Line 64, "rotatation" should read --rotation--.

COLUMN 20

Line 63, "the" (first occurrence) should be deleted.

UNITED STATES PATENT AND TRADEMARK OFFICE
CERTIFICATE OF CORRECTION

PATENT NO.  : 5,182,843
DATED       : February 2, 1993
INVENTOR(S) : SACHIO UMETSU, ET AL.

It is certified that error appears in the above-identified patent and that said Letters Patent is hereby corrected as shown below:

<u>COLUMN 22</u>

Line 12, "man" should read --man- --.

Signed and Sealed this

Twenty-second Day of March, 1994

Attest:

BRUCE LEHMAN

Attesting Officer — Commissioner of Patents and Trademarks